(12) United States Patent
Onuki et al.

(10) Patent No.: US 12,477,952 B2
(45) Date of Patent: Nov. 18, 2025

(54) MEMORY DEVICE AND ELECTRONIC DEVICE

(71) Applicant: Semiconductor Energy Laboratory Co., Ltd., Atsugi (JP)

(72) Inventors: Tatsuya Onuki, Atsugi (JP); Takayuki Ikeda, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 560 days.

(21) Appl. No.: 17/911,196

(22) PCT Filed: Mar. 17, 2021

(86) PCT No.: PCT/IB2021/052197
§ 371 (c)(1),
(2) Date: Sep. 13, 2022

(87) PCT Pub. No.: WO2021/191734
PCT Pub. Date: Sep. 30, 2021

(65) Prior Publication Data
US 2023/0106065 A1  Apr. 6, 2023

(30) Foreign Application Priority Data
Mar. 27, 2020  (JP) ................. 2020-058397

(51) Int. Cl.
*H10N 50/10* (2023.01)
*G11C 11/16* (2006.01)
(Continued)

(52) U.S. Cl.
CPC ......... *H10N 50/10* (2023.02); *G11C 11/1655* (2013.01); *G11C 11/1657* (2013.01); *H10B 61/20* (2023.02); *H10N 50/80* (2023.02)

(58) Field of Classification Search
None
See application file for complete search history.

(56) References Cited

U.S. PATENT DOCUMENTS 9,804,719 B2   10/2017   Takemura
9,869,716 B2   1/2018    Kurokawa
(Continued)

FOREIGN PATENT DOCUMENTS

JP    2006-186109 A    7/2006
JP    2013-242960 A   12/2013
(Continued)

OTHER PUBLICATIONS

International Search Report (Application No. PCT/IB2021/052197) Dated Jun. 22, 2021.
(Continued)

*Primary Examiner* — Khaja Ahmad
(74) *Attorney, Agent, or Firm* — Eric J. Robinson; Robinson Intellectual Property Law Office, P.C.

(57) ABSTRACT

A memory device with high storage capacity and low power consumption is provided. The memory device includes a first layer and a second layer including the first layer. The first layer includes a circuit, and the second layer includes a first memory cell. The circuit includes a bit line driver circuit and/or a word line driver circuit which transmits(s) a signal to the first memory cell. The first memory cell includes a first transistor, a second transistor, a conductor, and an MTJ element. The MTJ element includes a free layer. The free layer is electrically connected to the conductor. The first terminal of the first transistor is electrically connected to a first terminal of the second transistor through the conductor. The free layer is positioned above the conductor. The circuit includes a transistor containing silicon in a channel formation region, and each of the first transistor and the second transistor contains a metal oxide in a channel formation region.

4 Claims, 15 Drawing Sheets

(51) Int. Cl.
*H10B 61/00* (2023.01)
*H10N 50/80* (2023.01)

(56) References Cited

U.S. PATENT DOCUMENTS

| | | |
|---|---|---|
| 10,055,232 B2 | 8/2018 | Kurokawa |
| 10,068,946 B2 | 9/2018 | Shimomura et al. |
| 11,094,360 B2 | 8/2021 | Oikawa et al. |
| 2011/0065270 A1 | 3/2011 | Shim et al. |
| 2013/0044538 A1 | 2/2013 | Oh et al. |
| 2013/0069052 A1 | 3/2013 | Sandhu |
| 2016/0149004 A1 | 5/2016 | Rabkin et al. |
| 2016/0225423 A1 | 8/2016 | Naik et al. |
| 2017/0077177 A1 | 3/2017 | Shimomura et al. |
| 2018/0005668 A1* | 1/2018 | Shionoiri ............ G11C 11/4076 |
| 2019/0057731 A1* | 2/2019 | Lua ........................ H03K 3/45 |
| 2019/0334080 A1* | 10/2019 | Ahmed .................. H10N 50/01 |
| 2021/0272614 A1 | 9/2021 | Oikawa et al. |

FOREIGN PATENT DOCUMENTS

| | | |
|---|---|---|
| JP | 2015-228493 A | 12/2015 |
| JP | 2017-059679 A | 3/2017 |
| JP | 6089081 | 3/2017 |
| JP | 2018-148157 A | 9/2018 |
| WO | WO-2018/136003 | 7/2018 |
| WO | WO-2019/073333 | 4/2019 |
| WO | WO-2021/059079 | 4/2021 |
| WO | WO-2021/165799 | 8/2021 |
| WO | WO-2021/181192 | 9/2021 |

OTHER PUBLICATIONS

Written Opinion (Application No. PCT/IB2021/052197) Dated Jun. 22, 2021.

Zeinali.B et al., "Multilevel SOT-MRAM cell with a novel sensing scheme for high-density memory applications", Proceeding of 47th European Solid-State Device Research Conference 2017, Sep. 11, 2017, pp. 172-175.

* cited by examiner

FIG. 11A
| Amorphous | Intermediate state<br>New crystalline phase<br>Crystalline | Crystal |
|---|---|---|
| • completely amorphous | • CAAC<br>• nc<br>• CAC<br><br>excluding single crystal and poly crystal | • single crystal<br>• poly crystal |
FIG. 11B
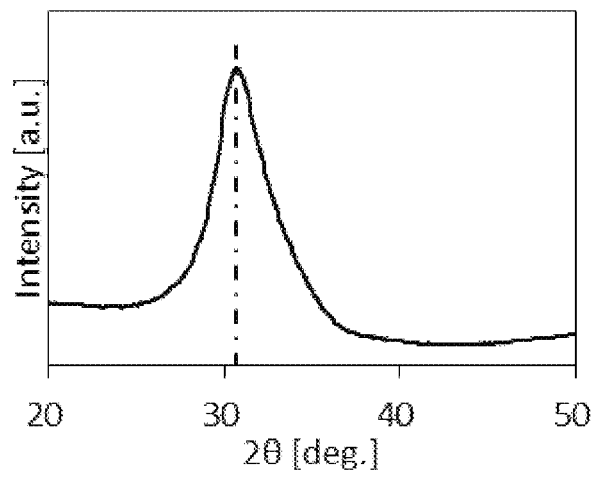
FIG. 11C
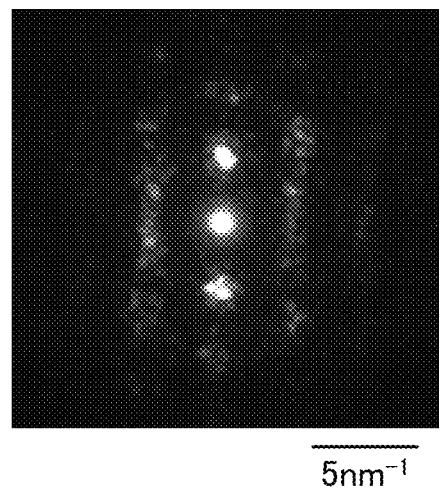

MEMORY DEVICE AND ELECTRONIC DEVICE

TECHNICAL FIELD

One embodiment of the present invention relates to a memory device and an electronic device.

Note that one embodiment of the present invention is not limited to the above technical field. The technical field of the invention disclosed in this specification and the like relates to an object, an operation method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an imaging device, a memory device, a signal processing device, a sensor, a processor, an electronic device, a system, a driving method thereof, a manufacturing method thereof, and a testing method thereof.

BACKGROUND ART

In recent years, the amount of data subjected to processing has been increasing, which makes a demand for a memory device having a higher storage capacity. To increase storage capacity per unit area, stacking memory cells as in the case of 3D NAND memory device or the like is effective (see Patent Document 1, Patent Document 2, and Patent Document 3). Stacking memory cells can increase storage capacity per unit area in accordance with the number of stacked memory cells.

PRIOR ART DOCUMENT

Patent Document

[Patent Document 1] United States Patent Application Publication No. 2011/0065270
[Patent Document 2] United States Patent Application Publication No. 2016/0149004
[Patent Document 3] United States Patent Application Publication No. 2013/0069052

SUMMARY OF THE INVENTION

Problems to be Solved by the Invention

A short time necessary for accessing memory, i.e., a high writing speed and a high reading speed, for example, is requirements for memory devices applicable to a cache memory, a main memory, or the like in computers. For example, an SRAM (Static Random Access Memory) and a DRAM (Dynamic Random Access Memory) each enables an access time (also called a delay time, latency, or the like in some cases) approximately from several nanoseconds to several tens of nanoseconds and thus have been used for a cache memory, a main memory, or the like in computers. Note that the SRAM, the DRAM, and the like are volatile memories, which means the amount of power consumption during retaining data is large in some cases. Thus, low power consumption as well as high storage capacity is required for memory devices used for a cache memory or a main memory in computers.

An object of one embodiment of the present invention is to provide a memory device with low power consumption. Another object of one embodiment of the present invention is to provide a memory device with high storage capacity. Another object of one embodiment of the present invention is to provide a novel memory device and the like. Another object of one embodiment of the present invention is to provide an electronic device including the memory device.

Note that the objects of one embodiment of the present invention are not limited to the objects listed above. The objects listed above do not preclude the existence of other objects. The other objects are objects that are not described in this section and will be described below. The objects that are not described in this section are derived from the description of the specification, the drawings, and the like and can be extracted as appropriate from the description by those skilled in the art. Note that one embodiment of the present invention is to achieve at least one of the objects listed above and the other objects. Note that one embodiment of the present invention does not necessarily achieve all the objects listed above and the other objects.

Means for Solving the Problems (1)
One embodiment of the present invention is a memory device including a first layer and a second layer overlapping with the first layer. The first layer includes a circuit, and the second layer includes the first memory cell. The circuit includes a bit line driver circuit and/or a word line driver circuit which transmit(s) a signal to the first memory cell. The first memory cell includes a first transistor, a second transistor, a conductor, and an MTJ element, and the MTJ element includes a free layer. The free layer is electrically connected to the conductor, and a first terminal of the first transistor is electrically connected to a first terminal of the second transistor through the conductor. The circuit includes a transistor containing silicon in a channel formation region, and each of the first transistor and the second transistor contains a metal oxide in a channel formation region.

(2)
Another embodiment of the present invention is a memory device including a first layer and a second layer overlapping with the first layer, which is different from a structure of the above (1). The first layer includes a circuit, and the second layer includes a first memory cell. The circuit includes a bit line driver circuit and/or a word line driver circuit which transmit(s) a signal to the first memory cell. The first memory cell includes a first transistor, a second transistor, a conductor, and an MTJ element, and the MTJ element includes a free layer and a fixed layer. The free layer is electrically connected to the conductor, a first terminal of the first transistor is electrically connected to a first terminal of the second transistor, a second terminal of the second transistor is electrically connected to the conductor, and a second terminal of the first transistor is electrically connected to the fixed layer. The fixed layer is positioned above the free layer. The circuit includes a transistor containing silicon in a channel formation region, and each of the first transistor and the second transistor contains a metal oxide in a channel formation region.

(3)
In the above (1) or (2) of one embodiment of the present invention, the conductor preferably includes a metal material causing the spin Hall effect when current flows through the conductor.

(4)

In any one of the above (1) to (3) of one embodiment of the present invention, a third layer may be included. It is preferable that the third layer include a second memory cell and the third layer be stacked over the second layer.

(5)

One embodiment of the present invention is an electronic device including the memory device in any one of the above (1) to (4) and a housing.

Note that in this specification and the like, a semiconductor device refers to a device that utilizes semiconductor characteristics, and means a circuit including a semiconductor element (a transistor, a diode, a photodiode, or the like), a device including the circuit, and the like. The semiconductor device also means devices that can function by utilizing semiconductor characteristics. For example, an integrated circuit, a chip including an integrated circuit, an electronic component including a chip in a package, and the like are examples of the semiconductor device. Moreover, a memory device, a display device, a light-emitting device, a lighting device, an electronic device, and the like themselves are semiconductor devices, or include semiconductor devices in some cases.

In the case where there is a description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, at least one element that enables electrical connection between X and Y (e.g., a switch, a transistor, a capacitor, an inductor, a resistor, a diode, a display device, a light-emitting device, or a load) can be connected between X and Y. Note that a switch has a function of being controlled to be turned on or off. That is, the switch has a function of being in a conducting state (on state) or a non-conducting state (off state) to control whether a current flows or not.

For example, in the case where X and Y are functionally connected, one or more circuits that allow functional connection between X and Y (e.g., a logic circuit (an inverter, a NAND circuit, a NOR circuit, or the like); a signal converter circuit (a digital-analog converter circuit, an analog-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; or a control circuit) can be connected between X and Y. For instance, even if another circuit is provided between X and Y, X and Y are regarded as being functionally connected when a signal output from X is transmitted to Y.

Note that an explicit description, X and Y are electrically connected, includes the case where X and Y are electrically connected (i.e., the case where X and Y are connected through another element or another circuit) and the case where X and Y are directly connected (i.e., the case where X and Y are connected without through another element or another circuit).

It can be expressed as, for example, "X, Y, and a source (or a first terminal or the like) and a drain (or a second terminal or the like) of a transistor are electrically connected to each other, and X, the source (or the first terminal or the like) of the transistor, the drain (or the second terminal or the like) of the transistor, and Y are electrically connected in this order". Alternatively, it can be expressed as "a source (or a first terminal or the like) of a transistor is electrically connected to X; a drain (or a second terminal or the like) of the transistor is electrically connected to Y; and X, the source (or the first terminal or the like) of the transistor, the drain (or the second terminal or the like) of the transistor, and Y are electrically connected in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit configuration is defined by an expression similar to the above examples, a source (or a first terminal or the like) and a drain (or a second terminal or the like) of a transistor can be distinguished from each other to specify the technical scope. Note that the above expressions are examples, and there is no limitation on the expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both of the components that are a wiring and an electrode. Thus, electrical connection in this specification includes, in its category, such a case where one conductive film has functions of a plurality of components.

In this specification and the like, a "resistor" can be, for example, a circuit element or a wiring having a resistance value higher than 0Ω. Therefore, in this specification and the like, a "resistor" sometimes includes a wiring having a resistance value, a transistor in which current flows between its source and drain, a diode, and a coil. Thus, the term "resistor" can be replaced with the terms "resistance", "load", "region having a resistance value", and the like; inversely, the terms "resistance", "load", and "region having a resistance value" can be replaced with the term "resistor" and the like. The resistance value can be, for example, preferably greater than or equal to 1 mΩ and less than or equal to 10Ω, further preferably greater than or equal to 5 mΩ and less than or equal to 5Ω, still further preferably greater than or equal to 10 mΩ and less than or equal to 1Ω. As another example, the resistance value may be greater than or equal to 1Ω and less than or equal to $1\times10^9$Ω.

In this specification and the like, a "capacitor" can be, for example, a circuit element having an electrostatic capacitance value higher than 0 F, a region of a wiring having an electrostatic capacitance value, parasitic capacitance, or gate capacitance of a transistor. The terms "capacitor", "parasitic capacitance", "gate capacitance", and the like can be replaced with the term "capacitance" and the like; inversely, the term "capacitance" can be replaced with the terms "capacitor", "parasitic capacitance", "gate capacitance", and the like. The term "pair of electrodes" in "capacitor" can be replaced with "pair of conductors", "pair of conductive regions", "pair of regions", and the like. Note that the electrostatic capacitance value can be greater than or equal to 0.05 fF and less than or equal to 10 pF, for example. As another example, the electrostatic capacitance value may be greater than or equal to 1 pF and less than or equal to 10 μF.

In this specification and the like, a transistor includes three terminals called a gate, a source, and a drain. The gate is a control terminal for controlling the conduction state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" can be replaced with each other in this specification and the like. In this specification and the like, expressions "one of a source and a drain" (or a first electrode or a first terminal) and "the other of the source and the drain" (or a second electrode or a second terminal) are used in description of the connection relation of a transistor. Depending on the transistor structure, a transistor may include a back gate in addition to the above three terminals. In that case, in this specification and the like, one of the gate and the back gate of the transistor may be referred to as a first gate and the other of the gate and the back gate of the transistor may be referred to as a second gate. In some cases, the terms "gate" and "back gate" can be replaced with each other in one transistor. In the case where a transistor includes three or more gates, the gates may be referred to as a first gate, a second gate, and a third gate, for example, in this specification and the like.

The case where a single circuit element is illustrated in a circuit diagram may indicate a case where the circuit element includes a plurality circuit elements. For example, the case where a single resistor is illustrated in a circuit diagram may indicate a case where two or more resistors are electrically connected to each other in series. For another example, the case where a single capacitor is illustrated in a circuit diagram may indicate a case where two or more capacitors are electrically connected to each other in parallel. For another example, the case where a single transistor is illustrated in a circuit diagram may indicate a case where two or more transistors are electrically connected to each other in series and their gates are electrically connected to each other. Similarly, for another example, the case where a single switch is illustrated in a circuit diagram may indicate a case where a switch includes two or more transistors which are electrically connected to each other in series or in parallel and whose gates are electrically connected to each other.

In this specification and the like, a node can be referred to as a terminal, a wiring, an electrode, a conductive layer, a conductor, an impurity region, or the like depending on the circuit configuration, the device structure, or the like. Furthermore, a terminal, a wiring, or the like can be referred to as a node.

In this specification and the like, "voltage" and "potential" can be replaced with each other as appropriate. "Voltage" refers to a potential difference from a reference potential, and when the reference potential is a ground potential, for example, "voltage" can be replaced with "potential". Note that the ground potential does not necessarily mean 0 V. Moreover, potentials are relative values, and a potential supplied to a wiring, a potential applied to a circuit and the like, and a potential output from a circuit and the like, for example, are changed with a change of the reference potential.

In this specification and the like, the terms "high-level potential" and "low-level potential" do not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

"Current" means a charge transfer (electrical conduction); for example, the description "electrical conduction of positively charged particles is caused" can be rephrased as "electrical conduction of negatively charged particles is caused in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of a current" in a wiring or the like refers to the direction in which a carrier with a positive charge moves, and the amount of current is expressed as a positive value. In other words, the direction in which a carrier with a negative charge moves is opposite to the direction of a current, and the amount of current is expressed as a negative value. Thus, in the case where the polarity of a current (or the direction of a current) is not specified in this specification and the like, the description "a current flows from element A to element B" can be rephrased as "a current flows from element B to element A", for example. As another example, the description "current is input to element A" can be rephrased as "current is output from element A".

Ordinal numbers such as "first", "second", and "third" in this specification and the like are used in order to avoid confusion among components. Thus, the terms do not limit the number of components. Furthermore, the terms do not limit the order of components. For example, a "first" component in one embodiment in this specification and the like can be referred to as a "second" component in other embodiments or claims. For another example, a "first" component in one embodiment in this specification and the like can be omitted in other embodiments or claims.

In this specification and the like, the terms for describing positioning, such as "over" and "under", are sometimes used for convenience to describe the positional relation between components with reference to drawings. The positional relation between components is changed as appropriate in accordance with the direction from which each component is described. Thus, the positional relation is not limited to that described with a term in this specification and the like and can be described with another term as appropriate depending on the situation. For example, the expression "an insulator positioned over (on) a top surface of a conductor" can be replaced with the expression "an insulator positioned under (on) a bottom surface of a conductor" when the direction of a drawing showing these components is rotated by 180°.

Furthermore, the terms such as "over" and "under" do not necessarily mean that a component is placed directly over or directly under and in direct contact with another component.

For example, the expression "electrode B over insulating layer A" does not necessarily mean that the electrode B is formed on and in direct contact with the insulating layer A, and does not exclude the case where another component is provided between the insulating layer A and the electrode B.

In this specification and the like, the terms such as "film" and "layer" can be interchanged with each other depending on the situation. For example, the term "conductive layer" can be changed into the term "conductive film" in some cases. Moreover, the term "insulating film" can be changed into the term "insulating layer" in some cases. Alternatively, the term "film", "layer", or the like is not used and can be interchanged with another term depending on the case or according to circumstances. For example, the term "conductive layer" or "conductive film" can be changed into the term "conductor" in some cases. Furthermore, for example, the term "insulating layer" or "insulating film" can be changed into the term "insulator" in some cases.

In this specification and the like, the terms "electrode," "wiring," and "terminal" do not functionally limit those components. For example, an "electrode" is used as part of a wiring in some cases, and vice versa. Furthermore, the terms "electrode" and/or "wiring" can also include the case where a plurality of "electrodes" and/or "wirings" are formed in an integrated manner. For example, a "terminal" is used as part of a "wiring" and/or an "electrode" in some cases, and vice versa. Furthermore, the term "terminal" can also include the case where a plurality of "electrodes", "wirings", "terminals", or the like are formed in an integrated manner. Therefore, for example, an "electrode" can be part of a "wiring" or a "terminal", and a "terminal" can be part of a "wiring" or an "electrode". Moreover, the term "electrode", "wiring", "terminal", or the like is sometimes replaced with the term "region", for example.

In this specification and the like, the terms "wiring", "signal line", "power supply line", and the like can be interchanged with each other depending on the case or according to circumstances. For example, the term "wiring" can be changed into the term "signal line" in some cases. As another example, the term "wiring" can be changed into the term "power supply line" in some cases. Conversely, the term "signal line", "power supply line", or the like can be changed into the term "wiring" in some cases. The term "power supply line" or the like can be changed into the term "signal line" or the like in some cases. Conversely, the term "signal line" or the like can be changed into the term "power supply line" or the like in some cases. The term "potential" that is applied to a wiring can be changed into the term "signal" or the like depending on the case or according to circumstances. Conversely, the term "signal" or the like can be changed into the term "potential" in some cases.

In this specification and the like, an impurity in a semiconductor refers to, for example, elements other than the main components of a semiconductor layer. For instance, an element with a concentration lower than 0.1 atomic % is an impurity. When an impurity is contained, for example, the density of defect states in a semiconductor is increased, carrier mobility is decreased, or crystallinity is decreased in some cases. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specifically, there are hydrogen (contained also in water), lithium, sodium, silicon, boron, phosphorus, carbon, nitrogen, and the like, for example. Specifically, when the semiconductor is a silicon layer, examples of impurities that change the characteristics of the semiconductor include Group 1 elements except hydrogen, Group 2 elements, Group 13 elements, Group 15 elements, and oxygen.

In this specification and the like, a switch has a function of being in a conducting state (on state) or a non-conducting state (off state) to determine whether a current flows or not. Alternatively, a switch has a function of selecting and changing a current path. For example, an electrical switch or a mechanical switch can be used. That is, a switch can be any element capable of controlling current, and is not limited to a particular element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conducting state" of the transistor refers to a state where a source electrode and a drain electrode of the transistor can be regarded as being electrically short-circuited. Furthermore, a "non-conducting state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical system) technology. Such a switch includes an electrode that can be moved mechanically, and operates by controlling conduction and non-conduction with movement of the electrode.

In this specification, "parallel" indicates a state where two straight lines are placed at an angle greater than or equal to $-10°$ and less than or equal to $10°$. Thus, the case where the angle is greater than or equal to $-5°$ and less than or equal to $5°$ is also included. Moreover, "approximately parallel" or "substantially parallel" indicates a state where two straight lines are placed at an angle greater than or equal to $-30°$ and less than or equal to $30°$. In addition, "perpendicular" indicates a state where two straight lines are placed at an angle greater than or equal to $80°$ and less than or equal to $100°$. Thus, the case where the angle is greater than or equal to $85°$ and less than or equal to $95°$ is also included. Furthermore, "approximately perpendicular" or "substantially perpendicular" indicates a state where two straight lines are placed at an angle greater than or equal to $60°$ and less than or equal to $120°$.

Effect of the Invention

According to one embodiment of the present invention, a memory device with lower power consumption can be provided. According to one embodiment of the present invention, a memory device with high storage capacity can be provided.

According to one embodiment of the present invention, a novel memory device or the like can be provided. According to one embodiment of the present invention, an electronic device including the memory device can be provided.

Note that the effects of one embodiment of the present invention are not limited to the effects listed above. The effects listed above do not preclude the existence of other effects. The other effects are effects that are not described in this section and will be described below. The effects that are not described in this section are derived from the description of the specification, the drawings, or the like and can be extracted as appropriate from the description by those skilled in the art. Note that one embodiment of the present invention has at least one of the effects listed above and the other effects. Accordingly, one embodiment of the present invention does not have the effects listed above in some cases.

BRIEF DESCRIPTION OF THE DRAWINGS

FIG. 11A is a diagram showing classifications of crystal structures of IGZO, FIG. 11B is a diagram showing an XRD spectrum of crystalline IGZO, and FIG. 11C is a diagram showing a nanobeam electron diffraction pattern of the crystalline IGZO.

MODE FOR CARRYING OUT THE INVENTION

Figure 1A:
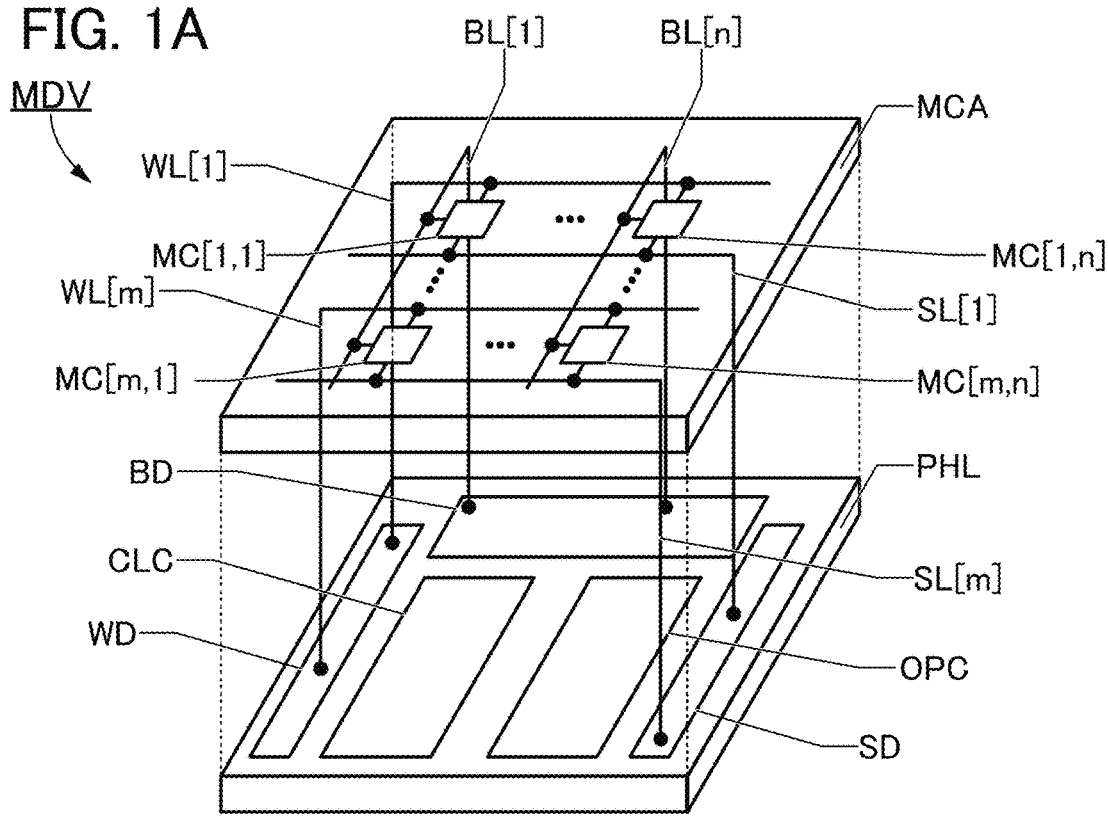
FIG. 1A and FIG. 1B are block diagrams illustrating a configuration example of a memory device.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in an active layer of a transistor is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

In this specification and the like, a metal oxide containing nitrogen is also referred to as a metal oxide in some cases. A metal oxide containing nitrogen may be referred to as a metal oxynitride.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined as appropriate.

Note that a content (or part of the content) described in one embodiment can be applied to, combined with, or replaced with at least one of another content (or part of the content) in the embodiment and a content (or part of the content) described in one or a plurality of different embodiments.

Note that in each embodiment, content described in the embodiment is content described using a variety of diagrams or content described with text disclosed in the specification.

Note that by combining a diagram (or part thereof) described in one embodiment with at least one of another part of the diagram, a different diagram (or part thereof) described in the embodiment, and a diagram (or part thereof) described in one or a plurality of different embodiments, much more diagrams can be formed.

Embodiments described in this specification will be described with reference to the drawings. Note that the embodiments can be implemented in many different modes, and it will be readily appreciated by those skilled in the art that modes and details can be changed in various ways without departing from the spirit and scope thereof. Therefore, the present invention should not be construed as being limited to the description of the embodiments. Note that in the structures of the invention in the embodiments, the same portions or portions having similar functions are denoted by the same reference numerals in different drawings, and repeated description thereof is omitted in some cases. In perspective views and the like, some components might not be illustrated for clarity of the drawings.

In this specification and the like, when a plurality of components are denoted by the same reference numerals, and in particular need to be distinguished from each other, an identification sign such as "_1", "[n]", or "[m,n]" is sometimes added to the reference numerals.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes, values, or the like shown in the drawings. For example, variations in signal, voltage, or current due to noise, variations in signal, voltage, or current due to difference in timing, or the like can be included.

Embodiment 1

In this embodiment, a memory device of one embodiment of the present invention will be described.
<Structure Example of Memory Device>

Figure 2:
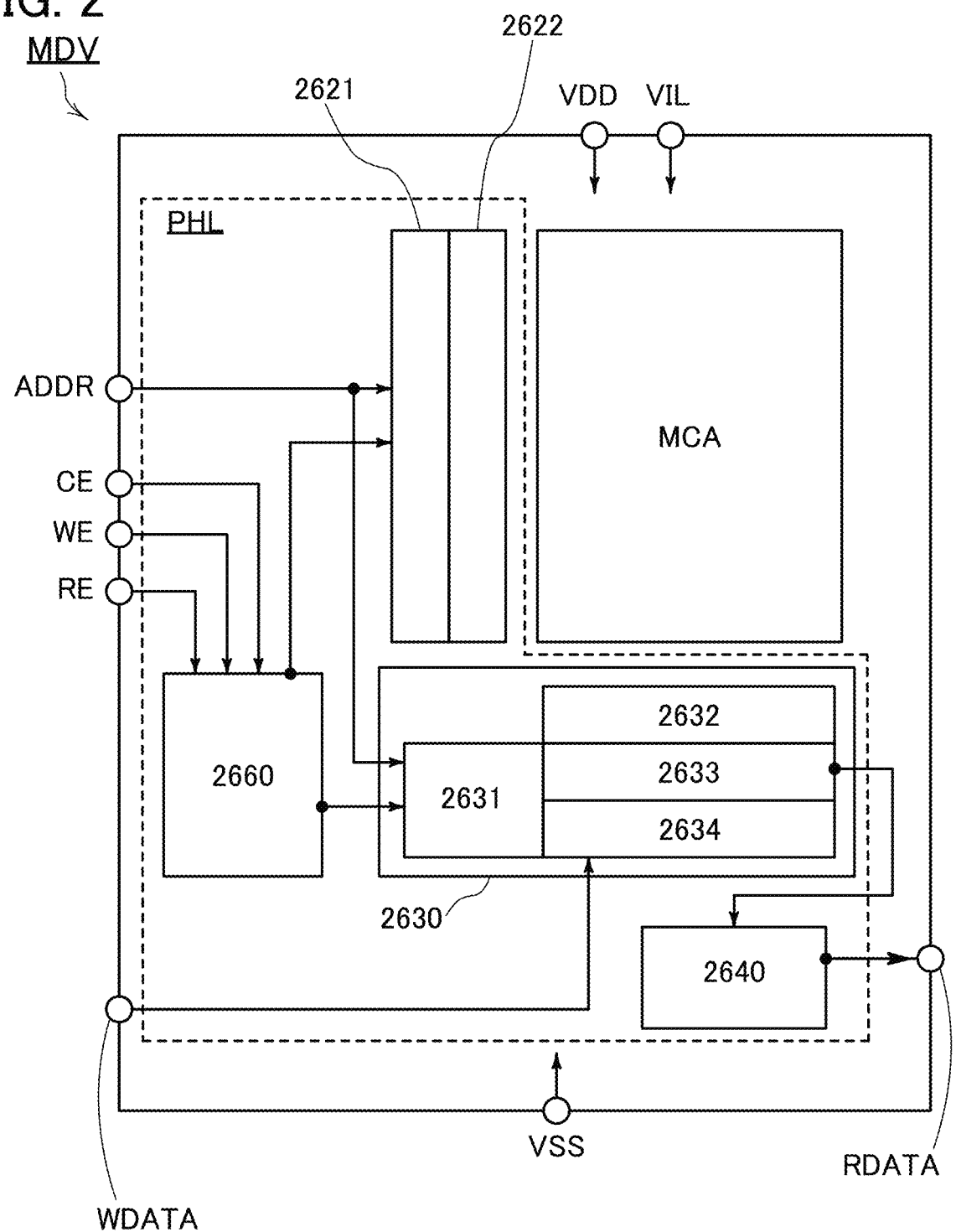
FIG. 2 is a block diagram illustrating a structure example of a memory device.

FIG. 2 illustrates a structure example of a memory device of one embodiment of the present invention. A memory device MDV includes a peripheral circuit PHL and a memory cell array MCA. The peripheral circuit PHL includes a row decoder 2621, a word line driver circuit 2622, a bit line driver circuit 2630, an output circuit 2640, and a control logic circuit 2660.

The bit line driver circuit 2630 includes a column decoder 2631, a precharge circuit 2632, a sense amplifier 2633, and a write circuit 2634. The precharge circuit 2632 has a function of precharging a wiring (not illustrated in FIG. 2) electrically connected to memory cells MC described later to have a predetermined potential. The sense amplifier 2633 has a function of obtaining a potential (or current) read out from the memory cells MC as a data signal and amplifying the data signal. The amplified data signal is output to the outside of the memory device MDV as a digital data signal RDATA through the output circuit 2640.

As power supply voltages, a low power supply voltage (VSS), a high power supply voltage (VDD) for the peripheral circuit PHL, and a power supply voltage (VIL) for the memory cell array MCA are supplied to the memory device MDV from the outside.

Control signals (CE, WE, RE), an address signal ADDR, and a data signal WDATA are input to the memory device MDV from the outside. The address signal ADDR is input to the row decoder 2621 and the column decoder 2631, and the data signal WDATA is input to the write circuit 2634.

The control logic circuit 2660 processes the signals (CE, WE, and RE) input from the outside, and generates control signals for the row decoder 2621 and the column decoder 2631. CE denotes a chip enable signal, WE denotes a write enable signal, and RE denotes a read-out enable signal. Signals processed by the control logic circuit 2660 are not limited to those listed above, and other control signals may be input as necessary.

Note that whether each circuit or each signal described above is provided or not can be determined as appropriate as needed.

Note that the structure example of this embodiment is not limited to the configuration illustrated in FIG. 2. For example, the structure may be changed as appropriate, such that the whole of part of the peripheral circuit PHL is provided under the memory cell array MCA.

Specifically, the memory device MDV may have a structure as illustrated in FIG. 1A, such that the peripheral circuit PHL is provided in a lower part and the memory cell array MCA is provided above the peripheral circuit PHL, for example.

The memory device MDV illustrated in FIG. 1A shows an example in which the memory cell array MCA includes m×n memory cells MC. In the memory cell array MCA, the memory cells MC are arranged in a matrix of m rows and n columns. A memory cell MC [1,1], a memory cell MC [m,1], a memory cell MC [1,n], and a memory cell MC [m,n] are extracted from the plurality of memory cells MC and are illustrated in FIG. 1A.

Furthermore, in the memory device MDV in FIG. 1A, the peripheral circuit PHL includes a circuit WD, a circuit BD, a circuit SD, a circuit CLC, and a circuit OPC. The peripheral circuit PHL does not necessarily have a structure including all of the circuit WD, the circuit BD, the circuit SD, the circuit CLC, and the circuit OPC but may have a structure including one or more selected from the circuit WD, the circuit BD, the circuit SD, the circuit CLC, and the circuit OPC.

The circuit WD can be used as a circuit corresponding to the word line driver circuit 2622 in FIG. 2, for example. The circuit WD is electrically connected to a wiring WL[1] to a wiring WL[m], for example. The circuit WD has a function of transmitting a selection signal to the plurality of memory cells MC included in the memory cell array MCA through the wiring WL[1] to the wiring WL[m].

Although FIG. 1A exemplifies that the wiring WL[1] to the wiring WL[m] are provided for respective rows of the memory cell array MCA, a plurality of wirings may be provided for one row of the memory cell array MCA.

The circuit BD can be used for a circuit corresponding to the bit line driver circuit 2630 illustrated in FIG. 2, for example. The circuit BD is, for example, electrically connected to a wiring BL[1] to a wiring BL[n]. The circuit BD functions as a circuit for transmitting a write signal to the memory cells MC included in the memory cell array MCA through the wiring BL[1] to the wiring BL[n]. Moreover, the circuit BD functions as a circuit for supplying a predetermined voltage or current in reading data to the memory cells MC included in the memory cell array MCA through the wiring BL[1] to the wiring BL[n].

Although FIG. 1A exemplifies that the wiring BL[1] to the wiring BL[n] are provided for respective columns of the memory cell array MCA, a plurality of wirings may be provided for one column of the memory cell array MCA. For example, a wiring transmitting a write signal and a wiring transmitting a read signal may be provided for one column of the memory cell array MCA.

The circuit SD can be used as a voltage generation circuit for supplying a predetermined voltage to the plurality of memory cells MC of the memory cell array MCA, for example. Furthermore, the circuit SD is electrically connected to a wiring SL[1] to a wiring SL[m], for example. Note that the memory device MDV in FIG. 1A may have such a structure that a power supply voltage (VIL) for the memory cell array MCA illustrated in FIG. 2 is directly input thereto instead of providing the circuit SD.

Although FIG. 1A exemplifies that the wiring SL[1] to the wiring SL[m] are provided for respective rows of the memory cell array MCA, a plurality of wirings may be provided for one row of the memory cell array MCA.

The circuit CLC can be used as a circuit corresponding to the control logic circuit 2660 illustrated in FIG. 2, for example.

The circuit OPC can be used as a circuit corresponding to the output circuit 2640 illustrated in FIG. 2, for example.

In the structure example of the memory device MDV in FIG. 1A, the peripheral circuit PHL can be formed on a semiconductor substrate, for example. In other words, the circuit WD, the circuit BD, the circuit SD, the circuit OPC, and the circuit CLC can be formed on a semiconductor substrate. The semiconductor substrate is, for example, a substrate containing silicon as its material, in which case a transistor containing silicon in a channel formation region (such a transistor is hereinafter called a Si transistor) can be formed on the substrate. Thus, a Si transistor can be used as a transistor included in the peripheral circuit PHL.

The semiconductor substrate may be a substrate containing germanium as its material, for example. The peripheral circuit PHL may be formed on a compound semiconductor substrate which contains silicon carbide, silicon germanium, gallium arsenide, indium phosphide, zinc oxide, gallium oxide, or the like as its material. Furthermore, the peripheral circuit PHL may be formed on a semiconductor substrate in which an insulator region is included, e.g., an SOI (Silicon On Insulator) substrate.

Moreover, the peripheral circuit PHL can be formed over an insulator substrate, for example. Examples of the insulator substrate include a glass substrate, a quartz substrate, a sapphire substrate, a stabilized zirconia substrate (e.g., an yttria-stabilized zirconia substrate), and a resin substrate, for example. Furthermore, the peripheral circuit PHL can be formed over a conductor substrate. Examples of the conductor substrate include a graphite substrate, a metal substrate, an alloy substrate, and a conductive resin substrate. Note that in the case of the insulator substrate and the conductor substrate, a channel formation region cannot be formed in the substrate, which is different from the case of a semiconductor substrate; that is, a transistor cannot be formed directly on an insulator substrate or a conductor substrate. Accordingly, in order to provide a transistor for the insulator substrate or the conductor substrate, it is necessary to provide a semiconductor film additionally over the insulator substrate or the conductor substrate.

As a method for forming the memory cell array MCA above the peripheral circuit PHL in the structure example of the memory device MDV in FIG. 1A, a formation method with a semiconductor process can be given. In particular, when an OS transistor, which can be formed with a semiconductor process, is employed as a transistor included in the memory cell array MCA, the memory cell array MCA can be provided above the semiconductor substrate and the peripheral circuit PHL.

Figure 1B:
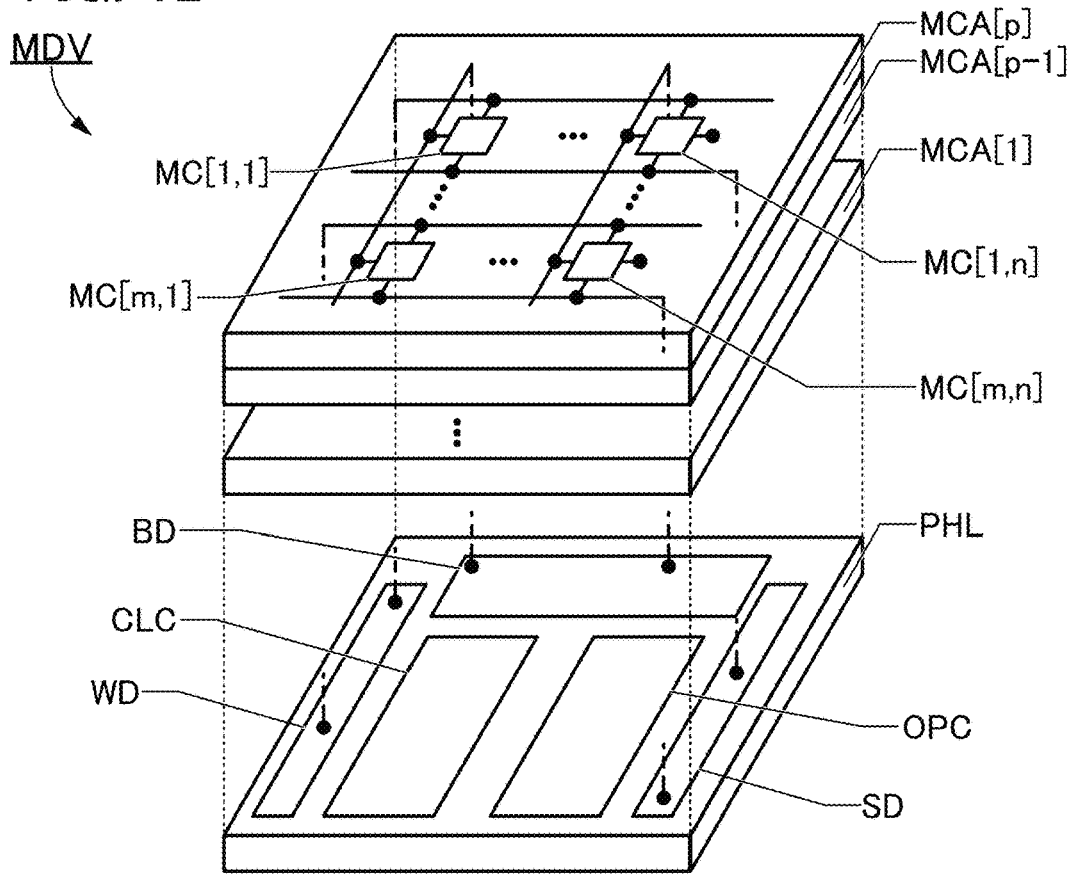

The structure in FIG. 1A is such that one memory cell array MCA is provided above the peripheral circuit PHL; however, the memory device of one embodiment of the present invention is not limited to the structure. For example, the memory device of one embodiment of the present invention may include a plurality of memory cell arrays MCA which are stacked above the peripheral circuit PHL. FIG. 1B illustrates a structure of a memory device in which a memory cell array MCA[1] to a memory cell array MCA[p] (p is an integer greater than or equal to 2) are stacked above the peripheral circuit PHL.

<<Configuration Example 1 of Memory Cell>>

Figure 3A:
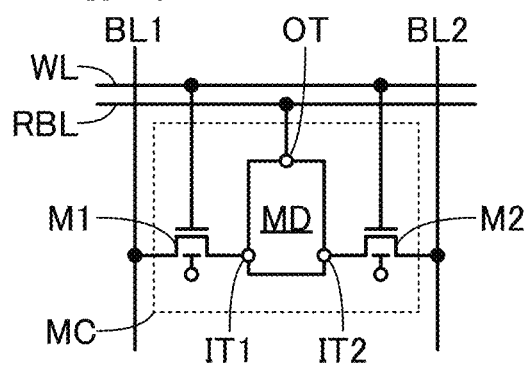
FIG. 3A to FIG. 3D are circuit diagrams each illustrating a configuration example of a memory cell.

FIG. 3A illustrates an example of a memory cell that can be included in the memory device MDV. The memory cell MC illustrated in FIG. 3A can be referred to as an example of a SOT-MRAM (Spin Orbit Torque-Magnetoresistive Random Access Memory) that is a three-terminal memory element.

The memory cell MC includes a transistor M1, a transistor M2, and a variable resistance device MD, for example.

An OS transistor can be used for example, as the transistor M1 and the transistor M2. It is preferable that a channel formation region of the OS transistor include an oxide containing at least one of indium, gallium, and zinc. Instead of the oxide, the channel formation region may be an oxide containing at least one of indium, an element M (as the element M, one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given for example), and zinc. It is further preferable that the OS transistor have a structure of the transistor described particularly in Embodiment 2.

The transistor M1 and the transistor M2 illustrated in FIG. 3A have back gates; however, the memory device of one embodiment of the present invention is not limited thereto. For example, the transistor M1 and the transistor M2 illustrated in FIG. 3A may each be a transistor having a structure not including a back gate, i.e., a single-gate structure. It is also possible that some transistors have a structure including a back gate and the other transistors have a structure not including a back gate.

The transistor M1 and the transistor M2 are preferably equivalent in size (e.g., a channel length, a channel width, a structure of a transistor, or the like) to each other. By making the transistors have the same size, each transistor can have almost the same electrical characteristics. Thus, the transistor M1 and the transistor M2 having the same size enables substantially the same operation to be done when transistor M1 and the transistor M2 are under the same condition. The same condition indicates, for example, input potentials to a source, a drain, a gate, and the like of each of the transistor M1 and the transistor M2.

Note that the transistor M1 and the transistor M2 may function as switching elements unless otherwise specified. In other words, the gate voltage, the source voltage, and the drain voltage of each of the above-described transistors may be within the range where the transistor operates as the switching element. Furthermore, the transistor M1 and the transistor M2 in an on state may operate in a linear region or a saturation region.

The above variation examples for the structure, operation, and the like of the transistor are not applied only to the transistor M1 and the transistor M2. For example, transistors described in other parts of the specification or transistors illustrated in other drawings may have variations in structures, operations, and the like, in a similar manner.

The variable resistance device MD includes an MTJ (magnetic tunnel junction) element ME. In addition, the variable resistance device MD includes a terminal IT1, a terminal IT2, and a terminal OT. The details of the variable resistance device MD will be described later.

A first terminal of the transistor M1 is electrically connected to the terminal IT1 of the variable resistance device MD, a second terminal of the transistor M1 is electrically connected to a wiring BL1, and a gate of the transistor M1 is electrically connected to a wiring WL. A first terminal of the transistor M2 is electrically connected to the terminal IT2 of the variable resistance device MD, a second terminal of the transistor M2 is electrically connected to a wiring BL2, and a gate of the transistor M2 is electrically connected to the wiring WL. The terminal OT of the variable resistance device MD is electrically connected to a wiring RBL The wiring BL1 and the wiring BL2 function as a write bit line for the memory cell MC or a wiring for supplying a constant voltage to the memory cell MC, for example.

The wiring WL functions as a word line for the memory cell MC, for example.

The wiring RBL functions as a read bit line for the memory cell MC, for example.

For the transistor M1 and/or the transistor M2 in FIG. 3A, the back gate is illustrated but the connection structure of the back gate is not illustrated; a target to which the back gate is electrically connected can be determined at the design stage. For example, in a transistor including a back gate, a gate and the back gate may be electrically connected to each other to increase the on-state current of the transistor. That is, for example, the gate and the back gate of the transistor M1 may be electrically connected to each other, and the gate and the back gate of the transistor M2 may be electrically connected to each other. Furthermore, for example, in a transistor including a back gate, a wiring electrically connecting the back gate of the transistor to an external circuit or the like may be provided and a potential may be supplied to the back gate of the transistor with the external circuit or the like to change the threshold voltage of the transistor or to reduce the off-state current of the transistor. Specifically, such a memory cell MC can have a configuration in FIG. 3B. In the memory cell MC in FIG. 3B, a wiring BGE is electrically connected to the back gates of the transistor M1 and the transistor M2 included in the memory cell MC of FIG. 3A. Application of a predetermined voltage to the wiring BGE enables the threshold voltages of the transistor M1 and the transistor M2 to change.

Next, the variable resistance device MD is described.

Figure 4:
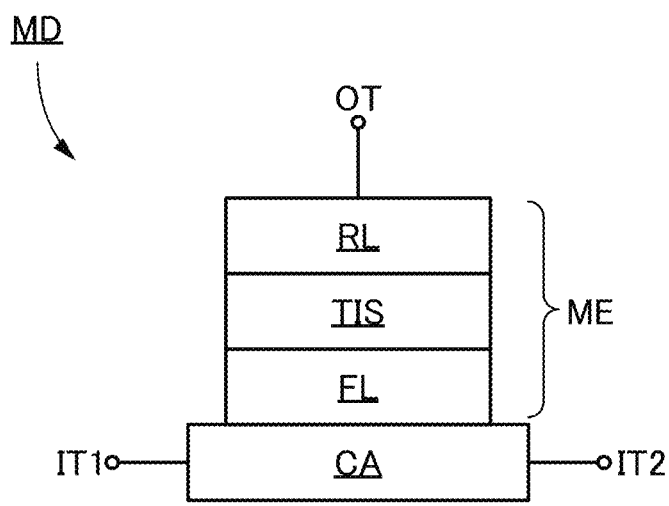
FIG. 4 is a schematic view illustrating a structure example of a memory element included in a memory cell.

FIG. 4 is a block diagram illustrating an example of the variable resistance device MD. The variable resistance device MD in FIG. 4 includes a layer RL, a layer TIS, a layer FL, and a layer CA. Note that the layer RL, the layer TIS, and the layer FL are included in the MTJ element ME.

The layer CA includes a conductive film, for example. The terminal IT1 and the terminal IT2 are electrically connected to each other through this film. Thus, a voltage is applied between the terminal IT1 and the terminal IT2, thereby making current flow between the terminal IT1 and the terminal IT2. The layer CA is referred to as a channel layer in some cases.

The film is formed using a material causing a spin Hall effect when current flows between the terminal IT1 and the terminal IT2. The spin Hall effect refers to a phenomenon in which a spin current is generated in the direction substantially perpendicular to the direction where the current flows. Specifically, when current flows in the two-dimensional plane of a thin film or the like, for example, the spin direction of electrons is polarized into different direction, i.e., directions toward a top surface and a bottom surface of the thin film, whereby the spin current is generated in the direction substantially perpendicular to the thin film. Thus, the layer CA can generate the spin current in the direction substantially perpendicular to the layer CA when the current flows between the terminal IT1 and the terminal IT2.

The layer CA preferably includes a metal material causing a spin Hall effect. Specifically, as the metal material, a transition metal which provides a high spin orbital interaction is preferably used. Examples of the transition metal include tungsten, platinum, and tantalum. Alternatively, the layer CA may include a topological insulator causing a spin Hall effect, instead of the metal material. In this case, an alloy of bismuth and antimony, an alloy of bismuth and selenium, or the like may be used.

The layer FL functions as a free layer in the MTJ element ME. The layer FL includes a ferromagnetic body allowing a magnetic moment to have a state where the free layer is parallel to or antiparallel to the magnetization direction of the layer RL described later.

The ferromagnetic body included in the layer FL is preferably a material which makes magnetization of the ferromagnetic body inverted with a weak spin current, for example. As a ferromagnetic material included in the layer FL, it is preferable to use a material which is less likely to cause magnetization inversion with thermal energy.

For the ferromagnetic body, for example, one selected from iron, cobalt, and nickel or an alloy of two more of the above can be used. For example, an alloy of cobalt, iron, and boron can be used. Alternatively, an alloy of manganese and gallium, an alloy of manganese and germanium, or the like can be used.

In the magnetic moment of the layer FL, spin torque is caused by the spin current generated in the layer CA. The magnetic moment of the layer FL inverts its direction when the spin torque exceeds a threshold value, for example. In other words, the magnetization direction of the layer FL can be changed by making current flow in the layer CA (between the terminal IT1 and the terminal IT2). With this operation, data can be stored in the MTJ element ME.

The layer TIS functions as a layer including a tunnel insulator in the MTJ element ME. When a voltage is applied between the layer FL and the layer RL (to the terminal OT), the tunnel magneto resistance effect occurs in the layer TIS, whereby the tunnel current can flow in the layer TIS. At this time, the electric resistance value of the layer TIS changes in accordance with the direction of the magnetic moment of the layer FL. Specifically, depending on whether the magnetization directions of the layer FL and the layer RL are parallel or antiparallel to each other, the electric resistance value of the layer TIS changes.

For the tunnel insulator, magnesium oxide, aluminum oxide, or the like can be used for example. In particular, crystalline magnesium oxide is preferably used as the tunnel insulator.

The layer RL functions as a fixed layer in the MTJ element ME. The layer RL includes a ferromagnetic body. Note that the ferromagnetic body of the layer RL has a fixed magnetization direction, which is different from the ferromagnetic body of the layer FL.

For the ferromagnetic body included in the layer RL, a material that can be used for the ferromagnetic body included in the layer FL can be used, for example.

It is preferable to combine the ferromagnetic materials and the tunnel insulator included in the MTJ element ME so as to have a high magnetoresistive ratio (MR ratio) of the MTJ element ME.

Here, examples of a method for writing data and a method for reading data in/from the memory cell MC in FIG. 3A are described.

When data is written to the memory cell MC, a high-level potential is supplied to the wiring WL, so that the transistor M1 and the transistor M2 are turned on. Next, a first potential is supplied from the wiring BL1 to the terminal IT1 through the transistor M1, and a second potential is supplied from the wiring BL2 to the terminal IT2 through the transistor M2. Accordingly, current corresponding to a potential difference between the first potential and the second potential flows between the terminal IT1 and the terminal IT2 in the variable resistance device MD. Consequently, the current flows in the layer CA of the MTJ element ME; that is, the spin current is generated in the layer CA. Depending on the spin current, the magnetization direction of the ferromagnetic body of the layer FL is determined. Note that the first potential may be higher or lower than the second potential. The potential supplied from the wiring RBL preferably falls in a range where current does not flow between the terminal IT1 and the terminal OT and/or the terminal IT2 and the terminal OT.

When data is read out from the memory cell MC, a high-level potential is supplied to the wiring WL, so that the transistor M1 and the transistor M2 are turned on. Next, predetermined voltages are applied to the terminal IT1, the terminal IT2, and the terminal OT to make the current flow between the terminal IT1 and the terminal OT and/or the terminal IT2 and the terminal OT. At this time, the electric resistance value of the MTJ element ME changes depending on whether the magnetization directions of the layer RL and the layer FL are parallel or antiparallel to each other. Accordingly, the amount of tunnel current flowing in the layer TIS of the MTJ element ME changes. At this point, the amount of current flowing between the MTJ element ME and the terminal OT is measured, whereby, data stored in the MTJ element ME can be read out. Alternatively, predetermined potentials are supplied to the terminal IT1 and the terminal IT2 to make the constant current flow between the MTJ element ME and the terminal OT, and the potential at the terminal OT is measured. In this way, data stored in the MTJ element ME can be read out.

Configuration Example 1 of Peripheral Circuit

Figure 5A:
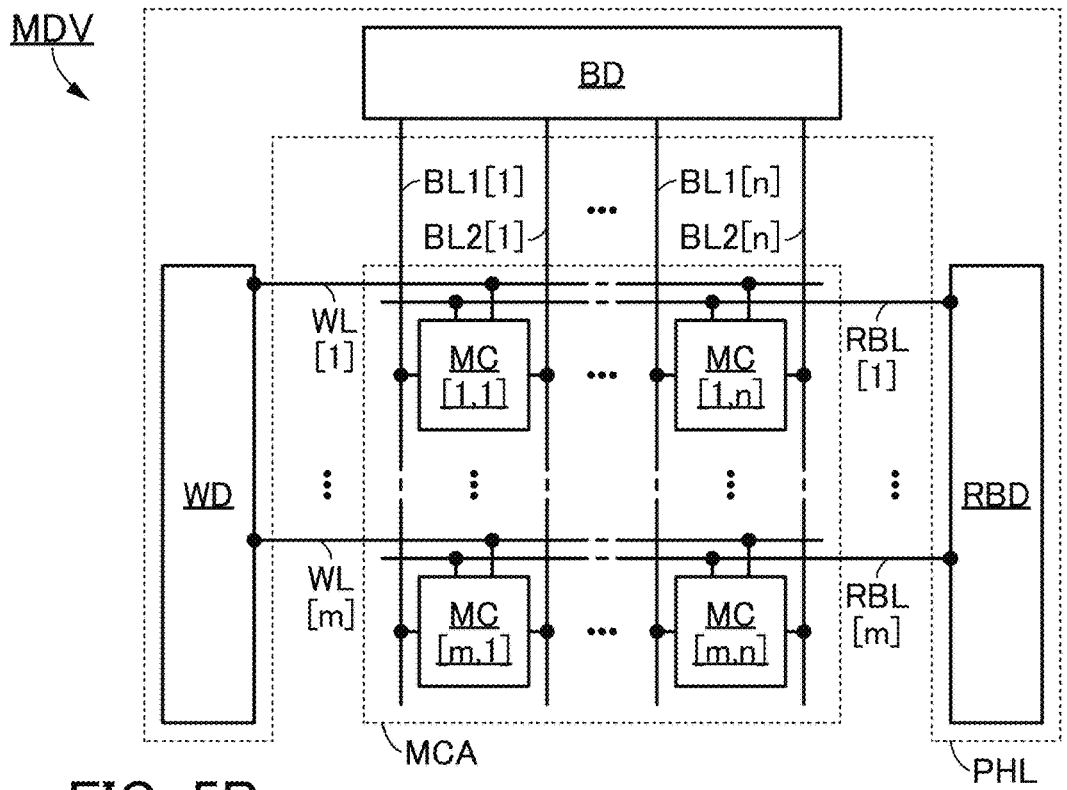
FIG. 5A and FIG. 5B are block diagrams each illustrating a configuration example of a memory device.

FIG. 5A illustrates a configuration example in which the memory cell MC in FIG. 3A is employed for the memory device MDV in FIG. 1A. Although components are shown on a plane in FIG. 5A for viewability, it is assumed that the memory cell array MCA is provided above the peripheral circuit PHL as in the memory device MDV in FIG. 1A.

In the memory device MDV illustrated in FIG. 5A, the description of components the same as those in the memory device MDV in FIG. 1A is omitted.

In the memory device MDV in FIG. 5A, the peripheral circuit PHL includes the circuit WD, the circuit BD, and a circuit RBD. For the circuit WD and the circuit BD, the description of the memory device MDV in FIG. 1A is referred to.

The circuit RBD is electrically connected to a wiring RBL[1] to a wiring RBL[m], for example. The circuit RBD functions as a circuit to receive data read out from the memory cells MC included in the memory cell array MCA through the wiring RBL[1] to the wiring RBL[m]. That is, the circuit RBD can be a circuit corresponding to the sense amplifier 2633 in the memory device MDV illustrated in FIG. 2. Thus, the circuit RBD may be included in the circuit BD corresponding to the bit line driver circuit 2630.

The circuit BD is electrically connected to a wiring BL1[1] to a wiring BL1[n] and a wiring BL2[1] to a wiring BL2[n] comparable to the wiring BL[1] to the wiring BL[n] in the memory device MDV illustrated in FIG. 1A. In other words, both the wiring BL1 and the wiring BL2 are provided for each column of the memory cell array MCA.

Here, it is preferable that the circuit BD be configured to input different voltages (or currents) to the wiring BL1 and the wiring BL2 in both the case of writing data into memory cells MC and the case of reading data from the memory cells MC.

The configuration example in which the memory cell MC in FIG. 3A is employed for the memory device MDV in FIG. 1A is not limited to the configuration of the memory device MDV in FIG. 5A. The memory device MDV in FIG. 5A can change its circuit configuration depending on circumstances.

Configuration Example 2 of Memory Cell

Figure 3B:
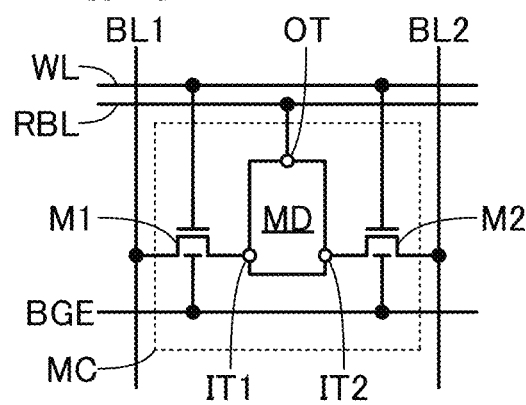
Figure 3C:
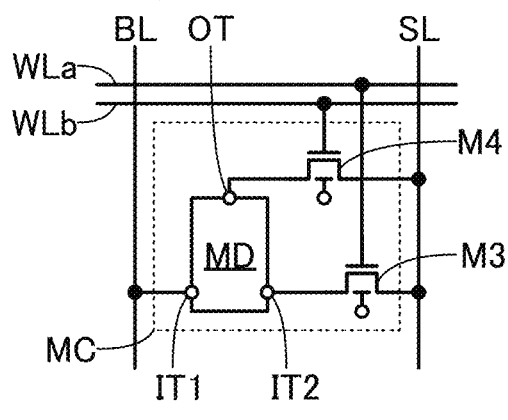

FIG. 3C illustrates an example of a memory cell that can be provided in the memory device MDV, which is different from the memory cell MC in FIG. 3A. Note that the memory cell in FIG. 3C can also be referred to as an example of SOT-MRAM.

The memory cell MC includes a transistor M3, a transistor M4, and the variable resistance device MD, for example.

Like the transistor M1 and the transistor M2, the transistor M3 and the transistor M4 can be OS transistors, for example. The variable resistance device MD includes the MTJ element ME illustrated in FIG. 4, like the variable resistance device MD in FIG. 3A.

The first terminal of the transistor M3 is electrically connected to the terminal IT2 of the variable resistance device MD, the second terminal of the transistor M3 is electrically connected to the wiring SL, and the gate of the transistor M3 is electrically connected to a wiring WLa. The first terminal of the transistor M4 is electrically connected to the terminal OT of the variable resistance device MD, the second terminal of the transistor M4 is electrically connected to the wiring SL, and the gate of the transistor M4 is electrically connected to a wiring WLb. The terminal IT1 of the variable resistance device MD is electrically connected to a wiring BL.

The wiring BL functions as a bit line for the memory cell MC or a wiring that supplies a constant voltage.

The wiring SL functions as a wiring that supplies a constant voltage, for example.

The wiring WLa functions as a writing word line and a reading word line for the memory cell MC, for example.

The wiring WLb functions as a reading word line for the memory cell MC, for example.

Next, examples of a method for writing data and a method for reading data in/from the memory cell MC in FIG. 3C are described. Note that, for example, a low-level potential is supplied to the wiring SL.

When data is written to the memory cell MC, a high-level potential is supplied to the wiring WLa, so that the transistor M3 is turned on, and a low-level potential is supplied to the wiring WLb, so that the transistor M4 is turned off. Next, a third potential higher than the low-level potential is supplied from the wiring BL to the terminal IT1. Accordingly, current corresponding to a potential difference between the third potential and the low-level potential flows between the terminal IT1 and the terminal IT2 in the variable resistance device MD. Consequently, the current flows in the layer CA of the MTJ element ME, and the spin current is generated in the layer CA. Depending on the spin current, the magnetization direction of the ferromagnetic body of the layer FL is determined.

When data is read out from the memory cell MC, a high-level potential is supplied to the wiring WLa, so that the transistor M3 is turned on, and a high-level potential is supplied to the wiring WLb, so that the transistor M4 is turned on. Next, a fourth potential that is higher than the low-level potential and lower than the third potential is supplied from the wiring BL to the terminal IT1; accordingly, current flows between the terminal IT1 and the terminal IT2 and/or the terminal IT1 and the terminal OT. At this time, the electric resistance value of the MTJ element ME changes depending on whether the magnetization directions of the layer RL and the layer FL are parallel or antiparallel to each other. Accordingly, the amount of tunnel current flowing in the layer TIS of the MTJ element ME changes. At this point, the amount of current flowing between the MTJ element ME and the terminal IT1 is measured, whereby data stored in the MTJ element ME can be read out. Alternatively, a predetermined potential is supplied to the wiring SL to make the constant current flow into the terminal IT1 of the MTJ element ME from the wiring BL, and the potential at the terminal IT1 is measured. In this manner, data stored in the MTJ element ME can be read out.

Figure 3D:
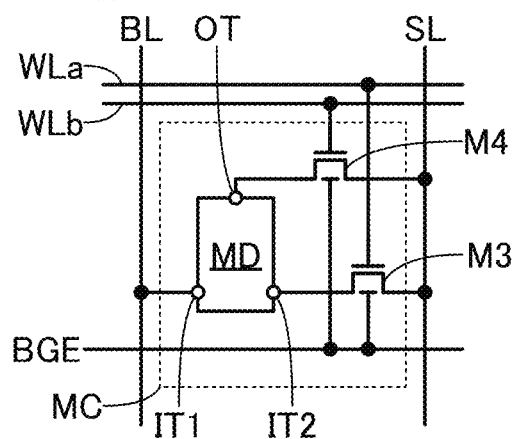

The memory cell MC in FIG. 3C may have a structure in which the back gates of the transistor M3 and the transistor M4 are electrically connected to the wiring BGE, as in the structure of FIG. 3B. Specifically, the memory cell MC can have a structure illustrated in FIG. 3D. Application of a predetermined potential to the wiring BGE enables the threshold voltages of the transistor M3 and the transistor M4 to change.

Configuration Example 2 of Peripheral Circuit

Figure 5B:
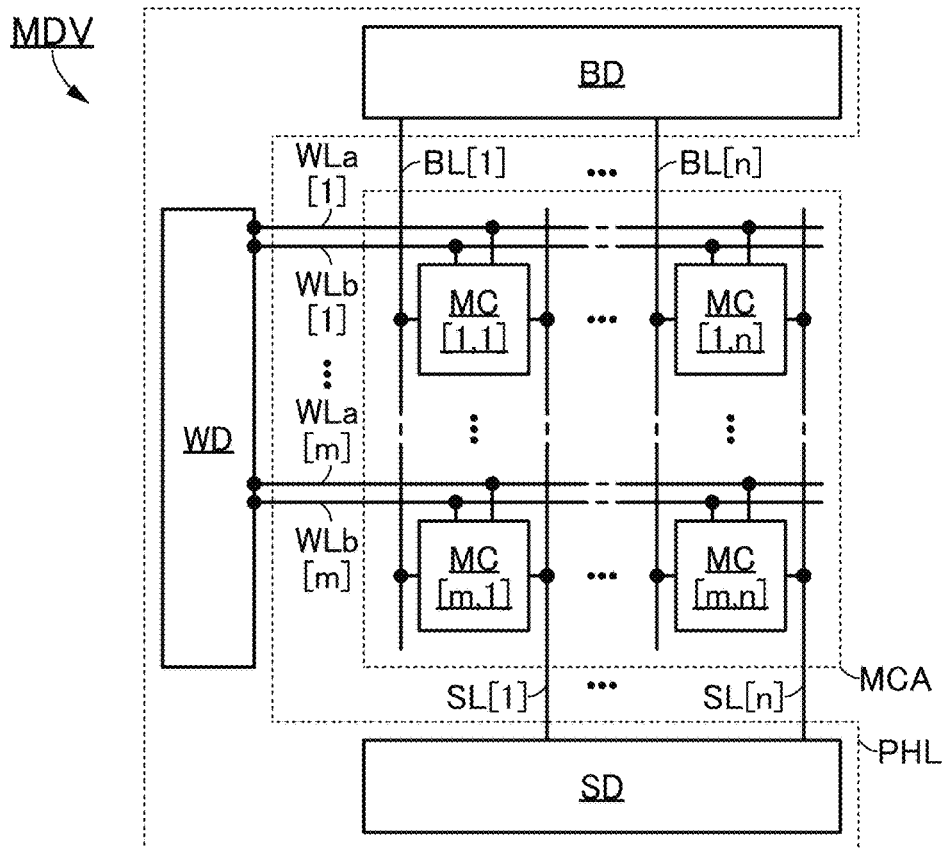

FIG. 5B illustrates a configuration example in which the memory cell MC in FIG. 3C is employed for the memory device MDV in FIG. 1A. Although components are shown on a plane in FIG. 5B for viewability, it is assumed that the memory cell array MCA is provided above the peripheral circuit PHL in the memory device MDV as illustrated in FIG. 5A.

In the memory device MDV illustrated in FIG. 5B, the description of components the same as those in the memory device MDV in FIG. 1A is omitted.

In the memory device MDV in FIG. 5B, the peripheral circuit PHL includes the circuit WD, the circuit BD, and the circuit SD. For the circuit WD, the circuit BD, and the circuit SD, description of the memory device MDV in FIG. 1A is referred to.

In the memory device MDV in FIG. 5B, the wiring SL[1] to the wiring SL[n] are provided not in the row direction but in the column direction, which is different from the memory device MDV in FIG. 1A. That is, the direction where the wiring is extended is not particularly limited in the memory device MDV.

The circuit WD is electrically connected to a wiring WLa[1] to a wiring WLa[m] and a wiring WLb[1] to a wiring WLb[m] comparable to the wiring WL[1] to the wiring WL[m] in the memory device MDV in FIG. 1A. In other words, the wirings WLa and the wiring WLb are provided in each row of the memory cell array MCA.

In this case, it is preferable that the circuit WD be configured to input different voltages to the wiring WLa and the wiring WLb in both the case of writing data into memory cells MC and the case of reading data from the memory cells MC.

The configuration example in which the memory cell MC in FIG. 3C is employed for the memory device MDV in FIG. 1A is not limited to the configuration of the memory device MDV in FIG. 5B. The memory device MDV in FIG. 5B can change its circuit configuration depending on circumstances.

Configuration Example 3 of Memory Cell

Figure 6A:
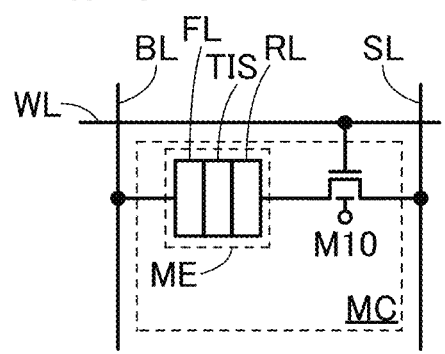
FIG. 6A to FIG. 6C are circuit diagrams each illustrating a circuit configuration example of a memory cell.

FIG. 6A illustrates an example of a memory cell that can be provided in the memory device MDV. The memory cell illustrated in FIG. 6A can be referred to as an example of STT-MRAM (Spin Transfer Torque-Magnetoresistive Random Access Memory).

The memory cell MC includes a transistor M10 and the above-described MTJ element ME.

Like the transistor M1 and the transistor M2, the transistor M10 can be an OS transistor, for example.

The MTJ element ME includes the layer FL including a free layer, the layer TIS including a tunnel insulator, and the layer RL including a fixed layer, as in the MTJ element illustrated in FIG. 4, and the layer FL and the layer RL overlap with each other with the layer TIS provided therebetween.

The first terminal of the transistor M10 is electrically connected to the layer RL of the MTJ element ME, the second terminal of the transistor M10 is electrically connected to the wiring SL, and the gate of the transistor M10 is electrically connected to the wiring WL. The layer FL of the MTJ element ME is electrically connected to the wiring BL.

The wiring BL functions as a writing bit line or a reading bit line for the memory cell MC, for example.

The wiring WL functions as a word line for the memory cell MC, for example.

The wiring SL functions as a wiring that supplies a constant voltage, for example. The constant voltage can be a low-level potential, for example.

Here, examples of a method for writing data and a method for reading data in/from the memory cell MC in FIG. 6A are described.

When data is written to the memory cell MC, a high-level potential is supplied to the wiring WL, so that the transistor M10 is turned on. Consequently, electrical continuity is established between the layer RL and the wiring SL. Depending on conditions of the voltage between the wiring BL and the wiring SL, the tunnel current is generated in the layer TIS, whereby current flows between the wiring BL and the wiring SL. In this case, a large quantity of electrons with spin directions aligned in one direction are made to flow in the layer FL, which enables the magnetization direction of the layer FL to change. Thus, data can be stored in the MTJ element ME.

When data is read from the memory cell MC, a high-level potential is supplied to the wiring WL, so that the transistor M10 is turned on. Consequently, electrical continuity is established between the layer RL and the wiring SL. The amount of current flowing in the MTJ element ME is determined depending on whether the magnetization directions of the layer RL and the layer FL are parallel or antiparallel to each other, when the constant voltage is applied to the wiring BL. Specifically, the amount of flowing current when the magnetization directions of the layer RL and the layer FL are parallel to each other, for example, is larger than that when the magnetization directions of the layer RL and the layer FL are antiparallel to each other. In other words, the measurement of the amount of current flowing in the MTJ element ME enables data stored in the MTJ element ME to be read out.

The memory cell MC in FIG. 6A makes electrons with spin directions aligned in one direction flow in the MTJ element ME to change the magnetization direction of the layer FL, thereby enabling data to be stored. However, the memory cell MC provided in the memory device of one embodiment of the present invention is not limited to this structure. For example, a structure may be employed, in which a wiring having a function of generating a magnetic field is provided in the vicinity of the MTJ element ME. With this structure, the magnetic field is generated from the wiring to change the magnetization direction of the layer FL in the MTJ element ME, whereby data can be written to the MTJ element ME.

Configuration Example 4 of Memory Cell

Figure 6B:
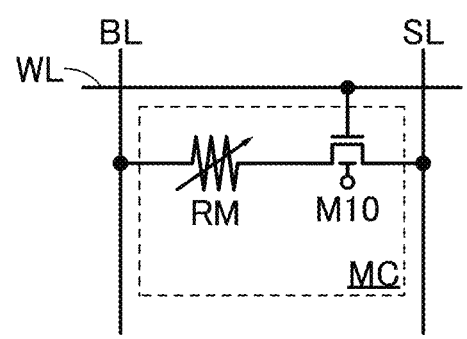

FIG. 6B illustrates an example of a memory cell that can be provided in the memory device MDV. The memory cell illustrated in FIG. 6B can be referred to as an example of ReRAM (Resistive Random Access Memory).

The memory cell MC includes the transistor M10 and a variable resistor RM.

Like the transistor M1 and the transistor M2, the transistor M10 can be an OS transistor.

As illustrated in FIG. 6B, the memory cell MC in FIG. 6B has a structure in which the MTJ element ME in the memory cell MC in FIG. 6A is replaced with the variable resistor RM. In the memory cell MC in FIG. 6B, the first terminal of the variable resistor RM is electrically connected to the first terminal of the transistor M10, and a second terminal of the variable resistor RM is electrically connected to the wiring BL.

The wiring BL functions as a writing bit line or a reading bit line for the memory cell MC, for example.

The wiring WL functions as a word line for the memory cell MC, for example.

The wiring SL functions as a wiring that supplies a constant voltage, for example. The constant voltage can be a reference potential, for example.

Here, examples of a method for writing data and a method for reading data in/from the memory cell MC in FIG. 6B are described.

When data is written to the memory cell MC, a high-level potential is supplied to the wiring WL, so that the transistor M10 is turned on. Accordingly, electrical continuity is established between the wiring BL and the wiring SL. A pulse voltage higher than the reference potential (a positive pulse voltage) or a pulse voltage lower than the reference potential (a negative pulse voltage) is applied to the wiring BL, whereby the pulse voltage is input to the second terminal of the variable resistor RM. At this time, depending on whether the voltage applied to the second terminal of the variable resistor RM is the positive pulse voltage or the negative pulse voltage, the electrical resistance of the variable resistor RM changes. Thus, data can be stored in the variable resistor RM in the memory cell MC.

When data is read from the memory cell MC, a high-level potential is supplied to the wiring WL, so that the transistor M10 is turned on. Accordingly, electrical continuity is established between the wiring BL and the wiring SL. In this point, when a constant voltage higher than the negative pulse voltage and lower than the positive pulse voltage is applied to the wiring BL, the amount of current flowing in the variable resistor RM is determined depending on a value of electrical resistance of the variable resistor RM. In other words, measurement of the amount of current flowing in the variable resistor RM enables data stored in the variable resistor RM to be read out.

Configuration Example 5 of Memory Cell

Figure 6C:
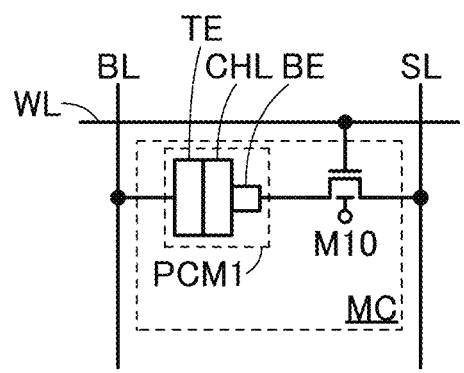

FIG. 6C illustrates an example of a memory cell that can be provided in the memory device MDV. The memory cell illustrated in FIG. 6C can be referred to as a phase-change memory (also referred to as PCM or PRAM in some cases).

The memory cell MC includes the transistor M10 and a phase-change memory PCM1.

Like the transistor M1 and the transistor M2, the transistor M10 can be an OS transistor, for example.

The phase-change memory PCM1 includes an electrode TE, a phase-change layer CHL, and an electrode BE, for example, and the electrode TE, the phase-change layer CHL, and the electrode BE are electrically connected in this order.

For the phase-change layer CHL, chalcogenide glass can be used, for example. This embodiment is described assuming that chalcogenide glass is employed for the phase-change layer CHL.

It is preferable that the size of area in contact with the phase-change layer CHL be different between the electrode TE and the electrode BE. For example, FIG. 6C illustrates that the area where the electrode TE contacts with the phase-change layer CHL is larger than the area where the electrode BE contacts with the phase-change layer CHL. When the area where the electrode BE contacts with the phase-change layer CHL is made small, heat can be locally given to the phase-change layer CHL. Thus, the phase change is more likely to occur in the phase-change layer CHL near the electrode BE than in the phase-change layer CHL near the electrode TE.

As illustrated in FIG. 6C, the memory cell MC in FIG. 6C has a structure in which the MTJ element ME in the memory cell MC in FIG. 6A is replaced with the phase-change memory PCM1. In the memory cell MC in FIG. 6C, the electrode BE of the phase-change memory PCM1 is electrically connected to the first terminal of the transistor M10, and the electrode TE of the phase-change memory PCM1 is electrically connected to the wiring BL.

The wiring BL functions as a writing bit line or a reading bit line for the memory cell MC, for example.

The wiring WL functions as a word line for the memory cell MC, for example.

The wiring SL functions as a wiring that supplies a constant voltage, for example. The constant voltage can be a low-level potential, for example.

Here, examples of a method for writing data and a method for reading data in/from the memory cell MC in FIG. 6C are described.

When data is written to the memory cell MC, a high-level potential is supplied to the wiring WL, so that the transistor M10 is turned on. Accordingly, electrically continuity is established between the wiring BL and the wiring SL. For example, when the chalcogenide glass in the phase-change layer CHL is in an amorphous state, the high-level potential is supplied from the wiring BL (specifically, the high-level voltage is applied between the electrode TE and the electrode BE), so that the amount of current flowing in the phase-change memory PCM1 is increased. In this case, impact ionization occurs in the chalcogenide glass, and the amount of carriers increases, which results in a rapid decrease in electrical resistance of the chalcogenide glass. Consequently, a larger amount of current flows in the chalcogenide glass, which generates Joule heat in the chalcogenide glass and increases the temperature of the chalcogenide glass. As a result, the chalcogenide glass is melted. Then, with control of the voltage from the wiring BL, the temperature of the chalcogenide glass is maintained in a range of crystallization temperatures, whereby the chalcogenide glass can be transferred into a polycrystalline state. Even when the supply of voltages from the wiring BL and the wiring SL is stopped after the chalcogenide glass is turned into a polycrystalline state, the chalcogenide glass can be maintained in a polycrystalline state.

Alternatively, after the chalcogenide glass has the temperature increased with Joule heat to be melted, the chalcogenide glass is rapidly cooled down by stopping the supply of voltages from the wiring BL and the wiring SL, so that the chalcogenide glass can be transferred into an amorphous state.

The memory cell MC changes the phase of the chalcogenide glass in the phase-change layer CHL, thereby enabling data to be stored in the phase-change memory PCM1.

When data is read from the memory cell MC, a high-level potential is supplied to the wiring WL, so that the transistor M10 is turned on. Accordingly, electrically continuity is established between the wiring BL and the wiring SL. In this point, when the voltage lower than that at the time of writing is supplied to the wiring BL, the amount of current flowing between the electrode TE and the electrode BE in the phase-change memory PCM1 is determined depending on whether the chalcogenide glass in the phase-change layer CHL is in an amorphous state or a polycrystalline state. Specifically, the amount of current is decreased when the chalcogenide glass is in an amorphous state, for example, and the amount of current is increased when the chalcogenide glass is in a polycrystalline state. In other words, the measurement of the amount of current flowing in the phase-change memory PCM1 enables data stored in the phase-change memory PCM1 to be read out.

A memory cell including memory elements such as the MTJ element ME, the variable resistor RM, and the phase-change memory PCM1 functions as a nonvolatile memory; thus, power for retaining data can be low. Therefore, with use of the above-described structure for a memory device, the memory device can achieve low power consumption. Furthermore, OS transistors and the like are used for transistors in the memory cells, which enables a memory cell array to be fabricated with a semiconductor process and to be stacked above peripheral circuits. With a plurality of memory cell arrays to be stacked, a memory device with high storage capacity can be provided.

Note that this embodiment can be combined with any of the other embodiments in this specification as appropriate.

Embodiment 2

In this embodiment, cross-sectional structure examples of the memory device described in the above embodiment will be described.

Figure 7:
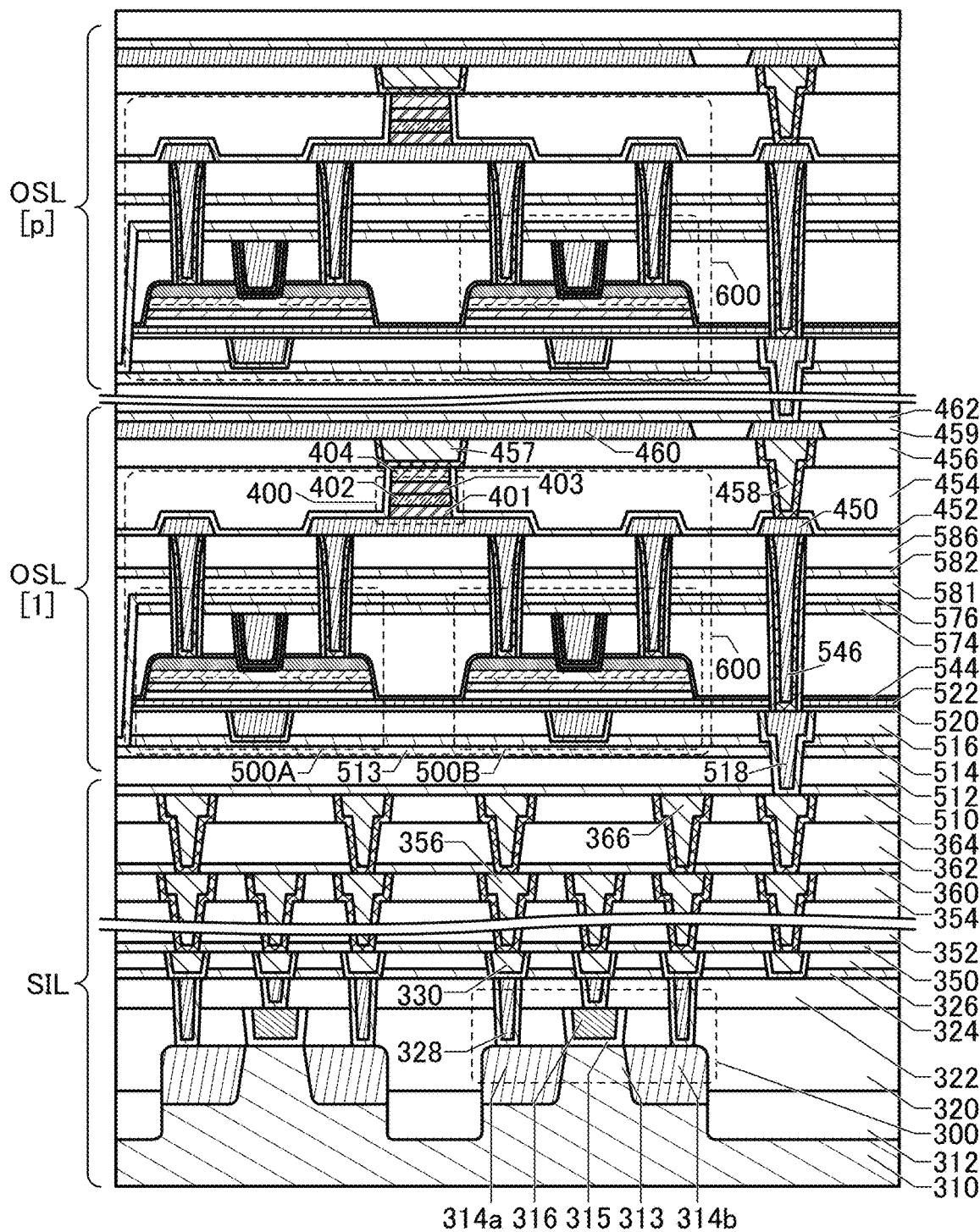
FIG. 7 is a schematic cross-sectional view illustrating a structure example of a memory device.

FIG. 7 is a schematic cross-sectional view illustrating a structure example of the memory device MDV in FIG. 1B. Specifically, the memory device MDV illustrated in FIG. 7 includes a layer SIL, and a layer OSL[1] to a layer OSL[p] (here, p is an integer greater than or equal to 1) provided above the layer SIL. The layer SIL includes the peripheral circuit PHL described in Embodiment 1, for example. Each of the layer OSL[1] to the layer OSL[p] includes the memory cell array MCA described in Embodiment 1, for example.

As an example, the layer SIL includes a transistor 300, and each of the layer OSL[1] to the layer OSL[p] includes a transistor 500A, a transistor 500B, and a memory element 400. Specifically, in this specification and the like, both or one of the transistor 500A and the transistor 500B is referred to as a transistor 500 in some cases.

Figure 8A:
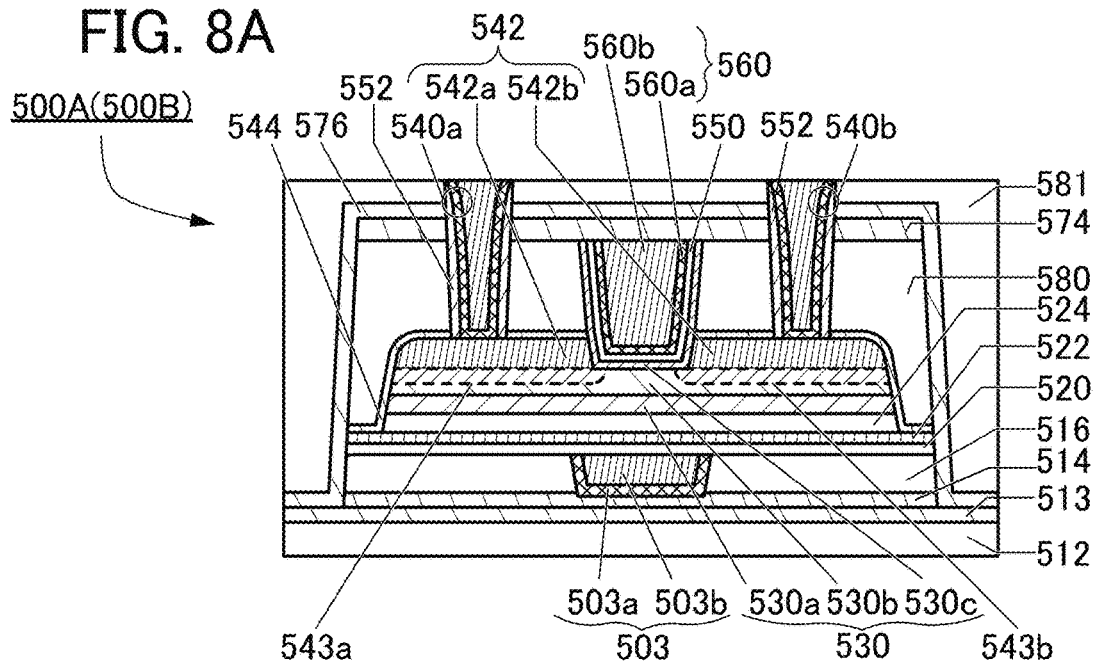
FIG. 8A to FIG. 8C are schematic cross-sectional views illustrating a structure example of a transistor.
Figure 8B:
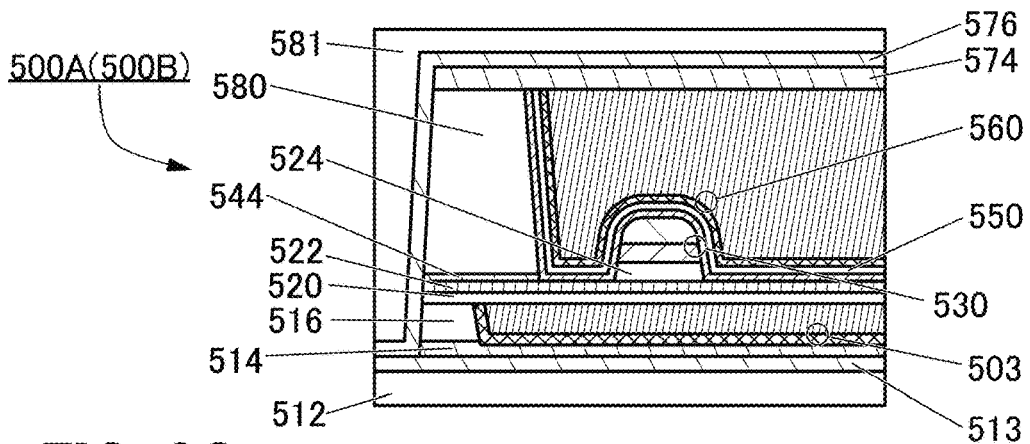
Figure 8C:
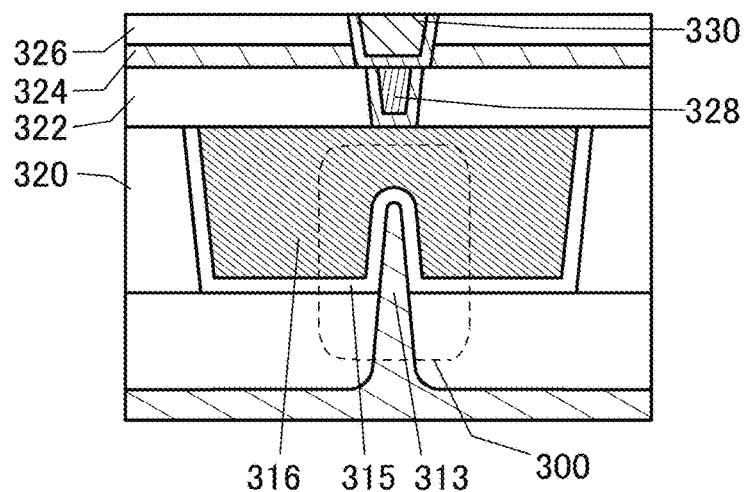

FIG. 8A is a cross-sectional view of the transistor 500 in the channel length direction, FIG. 8B is a cross-sectional view of the transistor 500 in the channel width direction, and FIG. 8C is a cross-sectional view of the transistor 300 in the channel width direction. Each of the transistors illustrated in FIG. 8A to FIG. 8C partly has a shape different from the corresponding transistor illustrated in FIG. 7 for description.

Each of the layer OSL[1] to the layer OSL[p] includes a memory cell 600. The memory cell 600 includes the transistor 500A, the transistor 500B, and the memory element 400.

For the memory cell 600, the structure of the memory cell MC in FIG. 3A is employed as an example. Specifically, the transistor 500A corresponds to one of the transistor M1 and the transistor M2, the transistor 500B corresponds to the other of the transistor M1 and the transistor M2, and the memory element 400 corresponds to the variable resistance device MD. Thus, in the memory device MDV illustrated in FIG. 7, the first terminal of the transistor 500A is electrically connected to the first terminal of the transistor 500B and the first terminal of the memory element 400.

One of the wiring BL1 and the wiring BL2 in FIG. 3A can, for example, correspond to a conductor 450 electrically connected to the second terminal of one of the transistor 500A and the transistor 500B. The other of the wiring BL1 and the wiring BL2 in FIG. 3A can, for example, correspond to the conductor 450 electrically connected to the second terminal of the other of the transistor 500A and the transistor 500B. The details of the conductor 450 are described later.

The wiring WL in FIG. 3A can be, for example, a conductor 560 corresponding to gates of the transistor 500A and the transistor 500B. The wiring RBL in FIG. 3A can be, for example, a conductor 460 electrically connected to the second terminal of the memory element 400. The details of the conductor 460 are described later.

The transistor 500 is a transistor containing a metal oxide in a channel formation region (an OS transistor). The transistor 500 has features that the off-state current is low and that the field-effect mobility hardly changes even at high temperatures. Using the transistor 500 as the transistor included in the above memory device and the like enables the memory device whose performance is less likely to degrade even at high temperatures, for example.

The peripheral circuit PHL included in the layer SIL includes, for example, the circuit WD, the circuit BD, the circuit SD, the circuit CLC, the circuit OPC, and the like as in the structure of the memory device MDV in FIG. 1B. Thus, the transistor 300 can be a transistor included in any of the circuit WD, the circuit BD, the circuit RBD, the circuit SD, the circuit CLC, the circuit OPC, and the like.

The transistor 300 includes a conductor 316, an element isolation layer 312, an insulator 315, a semiconductor region 313 that is part of a substrate 310, and a low-resistance region 314a and a low-resistance region 314b each functioning as a source region or a drain region.

As the substrate 310, for example, a semiconductor substrate can be used. As the semiconductor substrate, as described above, a substrate using silicon as a material, a substrate using germanium as a material, or the like can be used. Alternatively, a compound semiconductor substrate can be used as the substrate 310, for example. As the compound semiconductor substrate, as described above, a substrate using silicon carbide, silicon germanium, gallium arsenide, indium phosphide, zinc oxide, gallium oxide, or the like is used as a material.

As illustrated in FIG. 8C, in the transistor 300, a top surface and a side surface in the channel width direction of the semiconductor region 313 are covered with the conductor 316 with the insulator 315 therebetween. Such a Fin-type transistor 300 can have an increased effective channel width, and thus the transistor 300 can have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), GaN (gallium nitride), or the like. A structure using silicon whose effective mass is controlled by applying stress to the crystal lattice and changing the lattice spacing may be employed. Alternatively, the transistor 300 may be an HEMT (High Electron Mobility Transistor) with GaAs and GaAlAs, or the like.

The low-resistance region 314a and the low-resistance region 314b contain an element that imparts n-type conductivity, such as arsenic or phosphorus, or an element that imparts p-type conductivity, such as boron, in addition to the semiconductor material used in the semiconductor region 313.

For the conductor 316 functioning as a gate electrode, a semiconductor material such as silicon containing an element that imparts n-type conductivity, such as arsenic or phosphorus, or an element that imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

The element isolation layer 312 is provided to separate a plurality of transistors on the substrate 310 from each other. For the formation of the element isolation layer 312, a LOCOS (Local Oxidation of Silicon) method, an STI (Shallow Trench Isolation) method, a mesa isolation method, or the like can be used.

Note that the transistor 300 illustrated in FIG. 7 and FIG. 8C is an example and the structure is not limited thereto; an appropriate transistor can be used in accordance with a circuit structure, a driving method, or the like. For example, the transistor 300 illustrated in FIG. 7 and FIG. 8C may be a planar transistor.

In the transistor 300 in FIG. 7, an insulator 320, an insulator 322, an insulator 324, and an insulator 326 are stacked in this order over the substrate 310.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for planarizing a level difference caused by the transistor 300 or the like covered with the insulator 320 and the insulator 322. For example, a top surface of the insulator 322 may be planarized by planarization treatment using a chemical mechanical polishing (CMP) method or the like to increase planarity.

As the insulator 324, it is preferable to use a film having a barrier property that prevents diffusion of impurities such as water or hydrogen from the substrate 310, the transistor 300, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per unit area of the insulator 324 is less than or equal to $10 \times 10^{15}$ atoms/cm$^2$, preferably less than or equal to $5 \times 10^{15}$ atoms/cm', in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for an interlayer film, parasitic capacitance generated between wirings can be reduced.

Moreover, a conductor 328, a conductor 330, and the like are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where a part of a conductor functions as a wiring and another part of the conductor functions as a plug.

As a material of each of plugs and wirings (e.g., the conductor 328 and the conductor 330), a single layer or stacked layers of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings using a low-resistance conductive material such as aluminum or copper. The use of a low-resistance conductive material can reduce wiring resistance.

A wiring layer may be provided over the insulator 326 and the conductor 330. For example, in FIG. 7, an insulator 350, an insulator 352, and an insulator 354 are provided to be stacked in this order over the insulator 326 and the conductor 330. Furthermore, a conductor 356 is formed in the insulator 350, the insulator 352, and the insulator 354. The conductor 356 has a function of a plug or a wiring connected to the transistor 300, for example. Note that the conductor 356 can be provided using a material similar to those for the conductor 328 and the conductor 330.

For example, like the insulator 324, the insulator 350 is preferably formed using an insulator having a barrier property against impurities such as water or hydrogen. The insulator 352 and the insulator 354 are preferably formed using an insulator having a relatively low dielectric constant to reduce the parasitic capacitance generated between wirings, like the insulator 326. Furthermore, the conductor 356 preferably contains a conductor having a barrier property against water or hydrogen. In particular, the conductor having a barrier property against hydrogen is formed in an opening portion of the insulator 350 having a barrier property against hydrogen. With this structure, the transistor 300 and the transistor 500 can be separated by the barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is maintained. In that case, a structure is preferable in which a tantalum nitride layer having a barrier property against hydrogen is in contact with the insulator 350 having a barrier property against hydrogen.

An insulator 360, an insulator 362, and an insulator 364 are sequentially stacked over the insulator 354 and the conductor 356.

For example, like the insulator 324, the insulator 360 is preferably formed using an insulator having a barrier property against impurities such as water or hydrogen. Thus, the insulator 360 can be formed using any of the materials that can be used for the insulator 324, for example.

The insulator 362 and the insulator 364 have functions of an interlayer insulating film and a planarization film. For example, like the insulator 324, the insulator 362 and the insulator 364 are preferably formed using an insulator having a barrier property against impurities such as water or hydrogen. Thus, the insulator 362 and/or the insulator 364 can be formed using any of the materials usable for the insulator 324.

An opening portion is provided in regions of the insulator 360, the insulator 362, and the insulator 364 that overlap with part of the conductor 356, and the conductor 366 is embedded to fill the opening portion. The conductor 366 is also formed over the insulator 362. The conductor 366 has a function of a plug or a wiring connected to the transistor 300, for example. Note that the conductor 366 can be provided using a material similar to those for the conductor 328 and the conductor 330.

An insulator 510, an insulator 512, an insulator 513, an insulator 514, and an insulator 516 are stacked sequentially over the insulator 364 and the conductor 366. A substance having a barrier property against oxygen and/or hydrogen is preferably used for any of the insulator 510, the insulator 512, the insulator 513, the insulator 514, and the insulator 516.

For example, for the insulator 510 and the insulator 514, it is preferable to use a film having a barrier property that prevents diffusion of impurities such as water or hydrogen from the substrate 310, for example, into the region where the transistor 500 is provided. Thus, a material similar to that for the insulator 324 or the like can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the substrate 310. The film that inhibits hydrogen diffusion is specifically a film from which a small amount of hydrogen is released.

For the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen or moisture, which are factors of a change in electrical characteristics of the transistor. Accordingly, aluminum oxide can prevent mixing of impurities such as hydrogen or moisture into the transistor 500 in the manufacturing process and after manufacturing of the transistor. In addition, release of oxygen from the oxide included in the transistor 500 can be inhibited. Therefore, aluminum oxide is suitably used for the protective film of the transistor 500.

For example, the insulator 513 is preferably formed using a film having a barrier property that prevents impurities such as water or hydrogen from diffusing, like the insulator 510 and the insulator 514. In particular, in FIG. 7, the insulator 513 functions as a film for sealing the transistor 500 together with an insulator 576 described later. Thus, the insulator 513 is preferably formed using any of the materials usable for the insulator 576. The insulator 513 may be formed using any of materials usable for the insulator 510 or the insulator 514.

In addition, for the insulator 512 and the insulator 516, a material similar to that for the insulator 320 or the insulator 326 can be used, for example. Furthermore, when a material with a comparatively low permittivity is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (e.g., a conductor 503 illustrated in FIG. 8A and FIG. 8B), and the like are embedded in the insulator 510, the insulator 512, the insulator 513, the insulator 514, and the insulator 516. Note that the conductor 518 has a function of a wiring or a plug connecting the conductor 450, the conductor 460 (described later), the transistor 300 and the like. The conductor 518 can be provided using a material similar to those for the conductor 328 and the conductor 330, for example.

In particular, the conductor 518 in a region in contact with the insulator 510 and the insulator 514 is preferably a conductor having a barrier property against oxygen, hydrogen, and water. With this structure, the transistor 300 and the transistor 500 can be separated by the layer having a barrier property against oxygen, hydrogen, and water; hence, the diffusion of hydrogen from the transistor 300 into the transistor 500 can be inhibited.

The transistor 500 is provided above the insulator 516.

As illustrated in FIG. 8A and FIG. 8B, the transistor 500 includes the conductor 503 positioned to be embedded in the insulator 514 and the insulator 516, an insulator 520 positioned over the insulator 516 and the conductor 503, an insulator 522 positioned over the insulator 520, an insulator 524 positioned over the insulator 522, an oxide 530a positioned over the insulator 524, an oxide 530b positioned over the oxide 530a, a conductor 542a and a conductor 542b positioned apart from each other over the oxide 530b, an insulator 580 that is positioned over the conductor 542a and the conductor 542b and is provided with an opening formed to overlap with a region between the conductor 542a and the conductor 542b, an oxide 530c positioned on a bottom and a side surface of the opening, an insulator 550 positioned on a formation surface of the oxide 530c, and the conductor 560 positioned on a formation surface of the insulator 550. Note that the conductor 542a and the conductor 542b are collectively referred to as a conductor 542 in this specification and the like.

As illustrated in FIG. 8A and FIG. 8B, an insulator 544 is preferably provided between the insulator 580 and the oxide 530a, the oxide 530b, the conductor 542a, and the conductor 542b. In addition, as illustrated in FIG. 8A and FIG. 8B, the conductor 560 preferably includes a conductor 560a provided inside the insulator 550 and a conductor 560b provided to be embedded inside the conductor 560a. Moreover, as illustrate in FIG. 8A and FIG. 8B, an insulator 574 is preferably positioned over the insulator 580, the conductor 560, and the insulator 550.

Note that in the following description, the oxide 530a, the oxide 530b, and the oxide 530c are sometimes collectively referred to as an oxide 530.

The transistor 500 is illustrated to have a structure in which the three layers of the oxide 530a, the oxide 530b, and the oxide 530c are stacked in the region where the channel is formed and in the vicinity thereof; however, one embodiment of the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is illustrated to have a stacked-layer structure of two layers in the transistor 500, one embodiment of the present invention is not limited thereto. For example, the conductor 560 may have a single-layer structure or a stacked-layer structure of three or more layers. Note that the transistor 500 illustrated in FIG. 7, FIG. 8A, and FIG. 8B is an example, and the structure is not limited thereto; an appropriate transistor can be used in accordance with a circuit configuration or a driving method.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Thus, the conductor 560 can be formed without an alignment margin, resulting in a reduction in the area occupied by the transistor 500. Accordingly, miniaturization and high integration of the memory device can be achieved.

In addition, since the conductor 560 is formed in the region between the conductor 542a and the conductor 542b in a self-aligned manner, the conductor 560 does not include a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be increased and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is placed to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered. In this specification and the like, a transistor structure in which a channel formation region is electrically surrounded by electric fields of a first gate electrode and a second gate electrode is referred to as a surrounded channel (S-channel) structure.

In addition, the conductor 503 has a structure similar to that of the conductor 518; a conductor 503a is formed in contact with an inner wall of an opening of the insulator 514 and the insulator 516, and a conductor 503b is formed on the inner side. Although the transistor 500 is illustrated to have a structure in which the conductor 503a and the conductor 503b are stacked, one embodiment of the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the impurities are less likely to pass) is preferably used. Alternatively, it is preferable to use a conductive material that has a function of inhibiting diffusion of oxygen (e.g., at least one of an oxygen atom, an oxygen molecule, and the like) (through which the oxygen is less likely to pass). Note that in this specification, a function of inhibiting diffusion of impurities or oxygen means a function of inhibiting diffusion of any one or all of the impurities and the oxygen.

For example, when the conductor 503a has a function of inhibiting diffusion of oxygen, a reduction in conductivity of the conductor 503b due to oxidation can be inhibited.

In the case where the conductor 503 also functions as a wiring, a conductive material with high conductivity that contains tungsten, copper, or aluminum as its main component is preferably used for the conductor 503b. In the case where the conductivity of the wiring can be kept high, the conductor 503a is not necessarily provided. Note that the conductor 503b is illustrated as a single layer but may have a stacked-layer structure, for example, a stack of titanium or titanium nitride and any of the above conductive materials.

The insulator 520, the insulator 522, and the insulator 524 have a function of a second gate insulating film.

Here, as the insulator 524 that is in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved. Note that in this specification and the like, an oxygen vacancy in a metal oxide is sometimes referred to as Vo.

A transistor using metal oxide is likely to change its electrical characteristics when impurities or oxygen vacancies (Vo) exist in a region of the metal oxide where a channel is formed, which might degrade the reliability. In some cases, hydrogen in the vicinity of an oxygen vacancy (Vo) forms a defect that is an oxygen vacancy (Vo) into which hydrogen enters (hereinafter sometimes referred to as VoH), which generates an electron serving as a carrier. Therefore, when the region of the oxide semiconductor where a channel is formed includes oxygen vacancies, the transistor tends to have normally-on characteristics (characteristics with which, even when no voltage is applied to the gate electrode, the channel exists and current flows through the transistor). Thus, impurities, oxygen vacancies, and VoH are preferably reduced as much as possible in the region of the oxide semiconductor where a channel is formed. In other words, it is preferable that the region of the oxide semiconductor where a channel is formed have a reduced carrier concentration and be of an i-type (intrinsic) or substantially i-type.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably within the range of 100° C. to 700° C., or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of VoH is cut occurs, i.e., a reaction of "VoH→Vo+H" occurs. Part of hydrogen generated at this time is bonded to oxygen to be H$_2$O, and removed from the oxide 530 or an insulator near the oxide 530 in some cases. Part of hydrogen is diffused into or gettered (also referred to as gettering) by the conductor 542$a$ and the conductor 542$b$ in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ratio (O$_2$/(O$_2$+Ar)) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies (Vo). The heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "Vo+O→null". Furthermore, hydrogen remaining in the oxide 530 reacts with supplied oxygen, so that the hydrogen can be removed as H$_2$O (dehydration). This can inhibit recombination of hydrogen remaining in the oxide 530 with oxygen vacancies and formation of VoH.

When the insulator 524 includes an excess-oxygen region, it is preferable that the insulator 522 have a function of inhibiting diffusion of oxygen (e.g., oxygen atoms and oxygen molecules) (or that the above oxygen be less likely to pass through the insulator 522).

When the insulator 522 has a function of inhibiting diffusion of oxygen, impurities or the like, oxygen contained in the oxide 530 is not diffused to the insulator 520 side, which is preferable. Furthermore, the conductor 503 can be inhibited from reacting with oxygen contained in the insulator 524 and the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate (SrTiO$_3$), or (Ba,Sr)TiO$_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be lowered while the physical thickness is maintained.

It is particularly preferable to use an insulator containing an oxide of one or both of aluminum and hafnium, which is an insulating material that has a function of inhibiting diffusion of impurities, oxygen, and the like (through which the oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to the insulator, for example. Alternatively, the insulator may be subjected to nitriding treatment. Silicon oxide, silicon oxynitride, or silicon nitride may be stacked over the above insulator.

In addition, it is preferable that the insulator 520 be thermally stable. For example, silicon oxide and silicon oxynitride, which have thermal stability, are suitable. Furthermore, when an insulator that is a high-k material is combined with silicon oxide or silicon oxynitride, the insulator 520 having a stacked-layer structure that has thermal stability and a high dielectric constant can be obtained.

Note that in the transistor 500 in FIG. 8A and FIG. 8B, the insulator 520, the insulator 522, and the insulator 524 are shown as the second gate insulating film having a stacked-layer structure of three layers; alternatively, the second gate insulating film may be a single layer or may have a stacked-layer structure of two layers or four or more layers. In that case, the stacked layers are not necessarily formed of the same material and may be formed of different materials.

In the transistor 500, a metal oxide functioning as an oxide semiconductor is preferably used for the oxide 530 including the channel formation region. For example, as the oxide 530, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. In particular, the In-M-Zn oxide that can be used as the oxide 530 is preferably a CAAC-OS (C-Axis Aligned Crystalline Oxide Semiconductor) or a CAC-OS (Cloud-Aligned Composite Oxide Semiconductor). Alternatively, an In—Ga oxide, an In—Zn oxide, an In oxide, or the like may be used as the oxide 530.

Furthermore, a metal oxide with a low carrier concentration is preferably used for the transistor 500. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. Examples of impurities in a metal oxide include hydrogen, nitrogen, alkali metal, alkaline earth metal, iron, nickel, and silicon.

In particular, hydrogen contained in a metal oxide reacts with oxygen bonded to a metal atom to be water, and thus forms oxygen vacancies in the metal oxide in some cases. In the case where hydrogen enters an oxygen vacancy in the oxide 530, the oxygen vacancy and the hydrogen are bonded to each other to form VoH in some cases. The VoH serves as a donor and an electron serving as a carrier is generated in some cases. In some cases, bonding of part of hydrogen to oxygen bonded to a metal atom generates electrons serving as carriers. Thus, a transistor using a metal oxide containing a large amount of hydrogen is likely to have normally-on characteristics. Moreover, hydrogen in a metal oxide easily moves by stress such as heat and an electric field; thus, the reliability of a transistor may be low when the metal oxide contains a large amount of hydrogen. In one embodiment of the present invention, VoH in the oxide 530 is preferably reduced as much as possible so that the oxide 530 becomes a highly purified intrinsic or substantially highly purified intrinsic oxide. It is important to remove impurities such as moisture or hydrogen in a metal oxide (sometimes described as dehydration or dehydrogenation treatment) and to compensate for oxygen vacancies by supplying oxygen to the metal oxide (sometimes described as oxygen supplying treatment) to obtain a metal oxide whose VoH is sufficiently reduced. When a metal oxide in which impurities such as VoH are sufficiently reduced is used for a channel formation region of a transistor, stable electrical characteristics can be given.

A defect that is an oxygen vacancy into which hydrogen has entered can function as a donor of a metal oxide. However, it is difficult to evaluate the defects quantitatively. Thus, the metal oxide is sometimes evaluated in terms of not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Consequently, when a metal oxide is used for the oxide 530, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently low concentration of impurities such as hydrogen is used for a channel formation region of a transistor, the transistor can have stable electrical characteristics.

In the case where a metal oxide is used as the oxide 530, the metal oxide is an intrinsic (also referred to as i-type) or substantially intrinsic semiconductor that has a large band gap, and the carrier concentration of the metal oxide in the channel formation region is preferably lower than $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, yet still further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

In the case where a metal oxide is used as the oxide 530, contact between the oxide 530 and each of the conductor 542a and the conductor 542b may diffuse oxygen in the oxide 530 into the conductor 542a and the conductor 542b, resulting in oxidation of the conductor 542a and the conductor 542b in some cases. It is highly possible that oxidation of the conductor 542a and the conductor 542b lowers the conductivity of the conductor 542a and the conductor 542b. Note that diffusion of oxygen in the oxide 530 into the conductor 542a and the conductor 542b can be rephrased as absorption of oxygen in the oxide 530 by the conductor 542a and the conductor 542b.

When oxygen in the oxide 530 diffuses into the conductor 542a and the conductor 542b, a different layer is sometimes formed between the conductor 542a and the oxide 530b and between the conductor 542b and the oxide 530b. The different layer contains a larger amount of oxygen than the conductor 542a and the conductor 542b and thus presumably has an insulating property. In this case, a three-layer structure of the conductor 542a or the conductor 542b, the different layer, and the oxide 530b can be regarded as a three-layer structure of a metal, an insulator, and a semiconductor and is sometimes referred to as a MIS (Metal-Insulator-Semiconductor) structure or referred to as a diode-connected structure mainly formed of the MIS structure.

Note that the different layer is not necessarily formed between the oxide 530b and each of the conductor 542a and the conductor 542b; for example, the different layer is formed between the oxide 530c and each of the conductor 542a and the conductor 542b in some cases.

The metal oxide functioning as the channel formation region in the oxide 530 has a band gap of preferably 2 eV or more, further preferably 2.5 eV or more. The use of a metal oxide having a wide band gap can reduce the off-state current of the transistor.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic ratio of the element M to the constituent elements in the metal oxide used for the oxide 530a is preferably higher than the atomic ratio of the element M to the constituent elements in the metal oxide used for the oxide 530b. The atomic ratio of the element M to In in the metal oxide used for the oxide 530a is preferably higher than the atomic ratio of the element M to In in the metal oxide used for the oxide 530b. The atomic ratio of In to the element M in the metal oxide used for the oxide 530b is preferably higher than the atomic ratio of In to the element M in the metal oxide used for the oxide 530a. Moreover, a metal oxide that can be used as the oxide 530a or the oxide 530b can be used as the oxide 530c.

Specifically, as the oxide 530a, a metal oxide in which an atomic ratio of In to Ga and Zn (In:Ga:Zn) is 1:3:4 or 1:1:0.5 is used. As the oxide 530b, a metal oxide in which an atomic ratio of In to Ga and Zn (In:Ga:Zn) is 4:2:3 or 1:1:1 is used. As the oxide 530c, a metal oxide in which an atomic ratio of In to Ga and Zn (In:Ga:Zn) is 1:3:4 or an atomic ratio of Ga to Zn (Ga:Zn) is 2:1 or 2:5 is used. Specific examples of the case where the oxide 530c include a stacked-layer structure of a layer whose atomic ratio of In to Ga and Zn (In:Ga:Zn) is 4:2:3 and a layer whose atomic ratio of In to Ga and Zn (In:Ga:Zn) is 1:3:4; a stacked-layer structure of a layer whose atomic ratio of Ga to Zn (Ga:Zn) is 2:1 and a layer whose atomic ratio of In to Ga and Zn (In:Ga:Zn) is 4:2:3; a stacked-layer structure of a layer whose atomic ratio of Ga to Zn (Ga:Zn) is 2:5 and a layer whose atomic ratio of In to Ga and Zn (In:Ga:Zn) is 4:2:3; and a stacked-layer structure of gallium oxide and a layer whose atomic ratio of In to Ga and Zn (In:Ga:Zn) is 4:2:3.

For example, in the case where the atomic ratio of In to the element M in the metal oxide used as the oxide 530a is lower than the atomic ratio of In to the element M in the metal oxide used as the oxide 530b, an In—Ga—Zn oxide having a composition such that an atomic ratio of In:Ga:Zn=5:1:6 or a neighborhood thereof, In:Ga:Zn=5:1:3 or a neighborhood thereof, In:Ga:Zn=10:1:3 or a neighborhood thereof, or the like can be used as the oxide 530b.

As the oxide 530b, it is also possible to use a metal oxide having a composition such that In:Zn=2:1, a composition of In:Zn=5:1, or a composition of In:Zn=10:1 or a composition in the neighborhood of any one of these compositions, other than the above-described compositions.

The oxide 530a, the oxide 530b, and the oxide 530c are preferably combined to satisfy the above relation of the atomic ratios. For example, it is preferable that the oxide 530a and the oxide 530c each be a metal oxide having a composition such that In:Ga:Zn=1:3:4 or a composition in the neighborhood thereof and the oxide 530b be a metal oxide having a composition such that In:Ga:Zn=4:2:3 to 4:2:4.1 or a composition in the neighborhood thereof. Note that the above composition represents the atomic ratio of an oxide formed over a base or the atomic ratio of a sputtering target. Moreover, it is suitable that the proportion of In is increased in the composition of the oxide 530b because the transistor can have a higher on-state current, higher field-effect mobility, or the like.

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the densities of defect states in mixed layers formed at the interface between the oxide 530a and the oxide 530b and the interface between the oxide 530b and the oxide 530c are preferably made low.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element as its component; an alloy containing any of the above metal elements in combination; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

The conductor 542a and the conductor 542b are illustrated to have a single-layer structure in FIG. 8A and FIG. 8B, but may have a stacked-layer structure of two or more layers. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as illustrated in FIG. 8A, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier concentration of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover side surfaces of the oxide 530 and the insulator 524 and to be in contact with the insulator 522.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used as the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately set in consideration of required transistor characteristics.

The insulator 544 can inhibit impurities such as water and hydrogen contained in the insulator 580 from diffusing into the oxide 530b. Furthermore, oxidation of the conductor 560 due to excess oxygen contained in the insulator 580 can be inhibited.

The insulator 550 functions as a first gate insulating film. The insulator 550 is preferably placed in contact with the inner side (the top surface and the side surface) of the oxide 530c. Like the insulator 524, the insulator 550 is preferably formed using an insulator that contains excess oxygen and releases oxygen by heating.

Specifically, it is possible to use any of silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide each containing excess oxygen. In particular, silicon oxide and silicon oxynitride, which have thermal stability, are preferable.

When an insulator from which oxygen is released by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably lowered. The thickness of the insulator 550 is preferably greater than or equal to 1 nm and less than or equal to 20 nm.

To efficiently supply excess oxygen contained in the insulator 550 to the oxide 530, a metal oxide may be provided between the insulator 550 and the conductor 560. The metal oxide preferably inhibits diffusion of oxygen from the insulator 550 into the conductor 560. Providing the metal oxide that inhibits diffusion of oxygen inhibits diffusion of excess oxygen from the insulator 550 into the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current might arise because of a thinner gate insulating film; for that reason, when the insulator functioning as the gate insulating film has a stacked-layer structure of a high-k material and a thermally stable material, a gate potential during transistor operation can be lowered while the physical thickness is kept. Furthermore, the stacked-layer structure can be thermally stable and have a high dielectric constant.

Although the conductor 560 functioning as the first gate electrode has a two-layer structure in FIG. 8A and FIG. 8B, the conductor 560 may have a single-layer structure or a stacked-layer structure of three or more layers.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom and an oxygen molecule). When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560a, the oxide semiconductor that can be used for the oxide 530 can be used. In that case, when the conductor 560b is deposited by a sputtering method, the conductor 560a can have a reduced value of electrical resistance to be a conductor. Such a conductor can be referred to as an OC (Oxide Conductor) electrode.

A conductive material containing tungsten, copper, or aluminum as its main component is preferably used for the conductor 560b. Furthermore, the conductor 560b also functions as a wiring, and thus is preferably formed using a conductor having high conductivity. For example, a conductive material containing tungsten, copper, or aluminum as its main component can be used. Moreover, the conductor 560b may have a stacked-layer structure, for example, a stacked-layer structure of titanium or titanium nitride and the above conductive material.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. In particular, silicon oxide and silicon oxynitride, which have thermal stability, are preferable. In particular, silicon oxide and porous silicon oxide are preferable because an excess-oxygen region can be easily formed in a later step.

The insulator 580 preferably includes an excess-oxygen region. When the insulator 580 from which oxygen is released by heating is provided in contact with the oxide 530c, oxygen in the insulator 580 can be efficiently supplied to the oxide 530 through the oxide 530c. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the memory device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is formed by a sputtering method, excess-oxygen regions can be provided in the insulator 550 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

Parts of the insulator 574, the insulator 580, the insulator 544, the insulator 522, the insulator 520, the insulator 516, and the insulator 514 are removed, thereby forming an opening where the insulator 513 is exposed, and an insulator 576 having high barrier properties against hydrogen or water is provided to surround the transistor 500. Thus, the side surface of each of the insulator 574, the insulator 580, the insulator 544, the insulator 522, the insulator 520, the insulator 516, and the insulator 514 is in contact with the insulator 576. With this structure, entry of moisture and hydrogen from the outside into the transistor 500 can be prevented.

It is preferable that the insulator 513 and the insulator 576 have higher capability of inhibiting diffusion of hydrogen (e.g., at least one of a hydrogen atom, a hydrogen molecule, and the like) or a water molecule, as described above. For example, for the insulator 513 and the insulator 576, silicon nitride or silicon nitride oxide that is a material having a high hydrogen barrier property is preferably used. This can inhibit diffusion of hydrogen or the like into the oxide 530, whereby degradation of the characteristics of the transistor 500 can be inhibited. Consequently, the reliability of the memory device of one embodiment of the present invention can be increased.

An insulator 581 functioning as an interlayer film or a planarization film is preferably provided over the insulator 576. As in the insulator 524 and the like, the concentration of impurities such as water or hydrogen in the insulator 581 is preferably reduced.

An insulator 552 is provided on the side surface of the opening formed in the insulator 581, the insulator 576, the insulator 574, the insulator 580, and the insulator 544. A conductor 540a and a conductor 540b are provided in contact with side surfaces of the insulator 552 and the bottom surface of the opening. The conductor 540a and the conductor 540b are provided to face each other with the conductor 560 therebetween in FIG. 8A.

The insulator 552 is provided in contact with the insulator 581, the insulator 576, the insulator 574, the insulator 580, and the insulator 544, for example. The insulator 552 preferably has a function of inhibiting diffusion of hydrogen or water molecules. For example, for the insulator 552, an insulator such as silicon nitride, aluminum oxide, or silicon nitride oxide that is a material having a high hydrogen barrier property is preferably used. In particular, it is preferable to use silicon nitride for the insulator 552 because of its high hydrogen barrier property. By using a material having a high hydrogen barrier property for the insulator 552, diffusion of impurities such as water or hydrogen from the insulator 580 and the like into the oxide 530 through the conductor 540a and the conductor 540b can be inhibited. Furthermore, oxygen contained in the insulator 580 can be inhibited from being absorbed by the conductor 540a and the conductor 540b. Consequently, the reliability of the memory device of one embodiment of the present invention can be increased.

The conductor 540a and the conductor 540b can be provided using materials similar to those for the conductor 328, the conductor 330, and the conductor 503, for example. For each of the conductor 540a and the conductor 540b, it is particularly preferable to employ a stacked-layer structure including two or more layers, where a conductive material having a function of inhibiting diffusion of impurities such as a hydrogen atom, a hydrogen molecular, or a copper atom is formed for a first layer in contact with the insulator 552 and a conductive material with high conductivity, containing tungsten, copper, aluminum, or the like as a main component, is formed for a second and subsequent layers.

An insulator 582 is provided over the insulator 581 in FIG. 7. A substance having a barrier property against oxygen and/or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen or moisture, which are factors of a change in electrical characteristics of the transistor. Accordingly, aluminum oxide can prevent mixing of impurities such as hydrogen or moisture into the transistor 500 in the manufacturing process and after manufacturing of the transistor. In addition, release of oxygen from the oxide included in the transistor 500 can be inhibited. Therefore, aluminum oxide is suitably used for the protective film of the transistor 500.

An insulator 586 is provided over the insulator 582. For the insulator 586, a material similar to that for the insulator 320 can be used. Furthermore, when a material with a comparatively low permittivity is used for these insulators, parasitic capacitance generated between wirings can be reduced. A silicon oxide film, a silicon oxynitride film, or the like can be used for the insulator 586, for example.

As illustrated in FIG. 7 and FIG. 8A, the conductor 540a, the conductor 540b, a conductor 546, and the like are embedded in the insulator 520, the insulator 522, the insulator 524, the insulator 544, the insulator 580, the insulator 574, the insulator 576, the insulator 581, the insulator 582, and the insulator 586. For the conductor 546, any of the materials that can be used for the conductor 540a and the conductor 540b can be used, for example.

The conductor 540a, the conductor 540b, and the conductor 546 each have a function of a wiring or a plug connecting the transistor 500, the transistor 300, the conductor 450, the conductor 460 (described later), and the like. The conductor 540a and the conductor 540b can be provided using materials similar to those for the conductor 328 and the conductor 330. In particular, in FIG. 7, the conductor 546 is formed in contact with the conductor 518.

The conductor 450 may be provided over the conductor 540a, the conductor 540b, the conductor 546, and the insulator 586. The conductor 450 functions as a wiring that connects the conductor 460 described later, the transistor 300, the transistor 500, and the like. In particular, in FIG. 7, the conductor 450 is formed to be in contact with the conductor 540a, the conductor 540b, the conductor 546, and the like.

For the conductor 450, a metal film containing an element selected from molybdenum, titanium, tantalum, tungsten, aluminum, copper, chromium, neodymium, and scandium; a metal nitride film containing any of the above elements as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 450 has a single-layer structure in FIG. 7, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

Next, a structure of a memory element 400 is described below. Note that in this structure example, the memory element 400 is assumed as the MTJ element ME included in the variable resistance device MD in the memory cell MC illustrated in FIG. 3A, FIG. 3B, or the like.

The memory element 400 is provided in part of a region over the conductor 450. The memory element 400 includes a conductor 401, an insulator 402, a conductor 403, and a conductor 404, and the conductor 401, the insulator 402, the conductor 403, and the conductor 404 are stacked in this order in the region.

The conductor 401 is a free layer of the memory element 400 and corresponds to the layer FL in the MTJ element ME in FIG. 4. The insulator 402 is a tunnel insulator of the memory element 400 and corresponds to the layer TIS in the MTJ element ME in FIG. 4. The conductor 403 is a fixed layer of the MTJ element ME and corresponds to the layer RL in the MTJ element ME in FIG. 4. Thus, for materials usable for the conductor 401, the insulator 402, and the conductor 403, the description of the MTJ element ME in FIG. 4 is referred to.

The conductor 404 is provided as a hard mask for forming the conductor 401, the insulator 402, and the conductor 403. Thus, the conductor 404 can be formed using any of materials usable for the conductor 328, the conductor 330, or the like.

An insulator 452 is provided to cover the insulator 586, the conductor 450, the conductor 401, the insulator 402, the conductor 403, and the conductor 404.

For the insulator 452, a film having a barrier property that prevents impurities such as water or hydrogen from diffusing into the region where the transistor 500 is formed is preferably used, for example, as in the case of the insulator 324. In other words, the insulator 452 is preferably formed using any of materials usable for the insulator 324 or the like.

An insulator 454 is provided over the insulator 452. The insulator 454 functions as a planarization film for planarizing a level difference caused by the conductor 450, the memory element 400, the insulator 452, or the like. The insulator 454 can be formed in the following manner, for example. An insulator to be the insulator 454 is formed over the insulator 452, and then planarization treatment by a chemical mechanical polishing (CMP) method or the like is performed until the conductor 404 is exposed.

An insulator 456 is provided over the insulator 454, the insulator 452, and the conductor 404.

For each of the insulator 454 and the insulator 456, an insulator having a relatively low dielectric constant is preferably used as in the insulator 326. In other words, each of the insulator 454 and the insulator 456 is preferably formed using any of materials usable for the insulator 326.

A conductor 457 is embedded in the insulator 456. Furthermore, a conductor 458 is embedded in the insulator 452, the insulator 454, and the insulator 456. Note that the conductor 457 and the conductor 458 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where a part of a conductor functions as a wiring and another part of the conductor functions as a plug.

The conductor 460 is provided over the insulator 456, the conductor 457, and the conductor 458. The conductor 460 can be a wiring electrically connected to the memory element 400, for example. Specifically, the conductor 460 can be the wiring RBL shown in the memory cell MC in FIG. 4.

The conductor 460 can be formed using any of materials usable for the conductor 450, for example.

An insulator 459 is provided over the insulator 456. Depending on circumstances, the insulator 459 may be provided over the conductor 457 and/or the conductor 458. The insulator 459 functions as an insulator for separating wirings. Note that in the memory device MDV in FIG. 7, the insulator 459 is on the same level as the conductor 460 by planarization treatment such as a chemical mechanical polishing (CMP) method or the like.

For the insulator 459, for example, an insulator having a relatively low dielectric constant is preferably used as in the insulator 326. In other words, the insulator 459 is preferably formed using any of materials usable for the insulator 326.

An insulator 462 is provided over the conductor 460 and the insulator 459.

For the insulator 462, it is preferable to use a film having a barrier property to prevent diffusion of impurities such as water or hydrogen between layers OSL above and below the insulator 462. Thus, like the insulator 324 or the like, the insulator 462 is preferably formed using an insulator having a barrier property against impurities such as water or hydrogen, for example.

Furthermore, the layer OSL[2] (not illustrated) to the layer OSL[p] are provided above the insulator 462, and the layer OSL[2] to the layer OSL[p] can be formed in a process similar to that of the layer OSL[1]. Thus, the insulator 462 may be formed using a material similar to that of the insulator 510. When the layer OSL[2] to the layer OSL[p] are formed in a process similar to that of the layer OSL[1], the memory cell arrays MCA of the layer OSL[2] to the layer OSL[p] can be stacked above the memory cell array MCA included in the layer OSL[1], for example. In other words, the memory cells 600 of the layer OSL[2] to the layer OSL[p] can be stacked above the memory cell 600 included in the layer OSL[1]. Note that the structure example of the memory device MDV illustrated in FIG. 7 can be used for the memory device MDV in FIG. 1B.

Note that although the structure example of the memory device MDV in FIG. 7 shows that the memory cell 600 corresponds to the memory cell MC in FIG. 3A, one embodiment of the present invention is not limited thereto.

Figure 9:
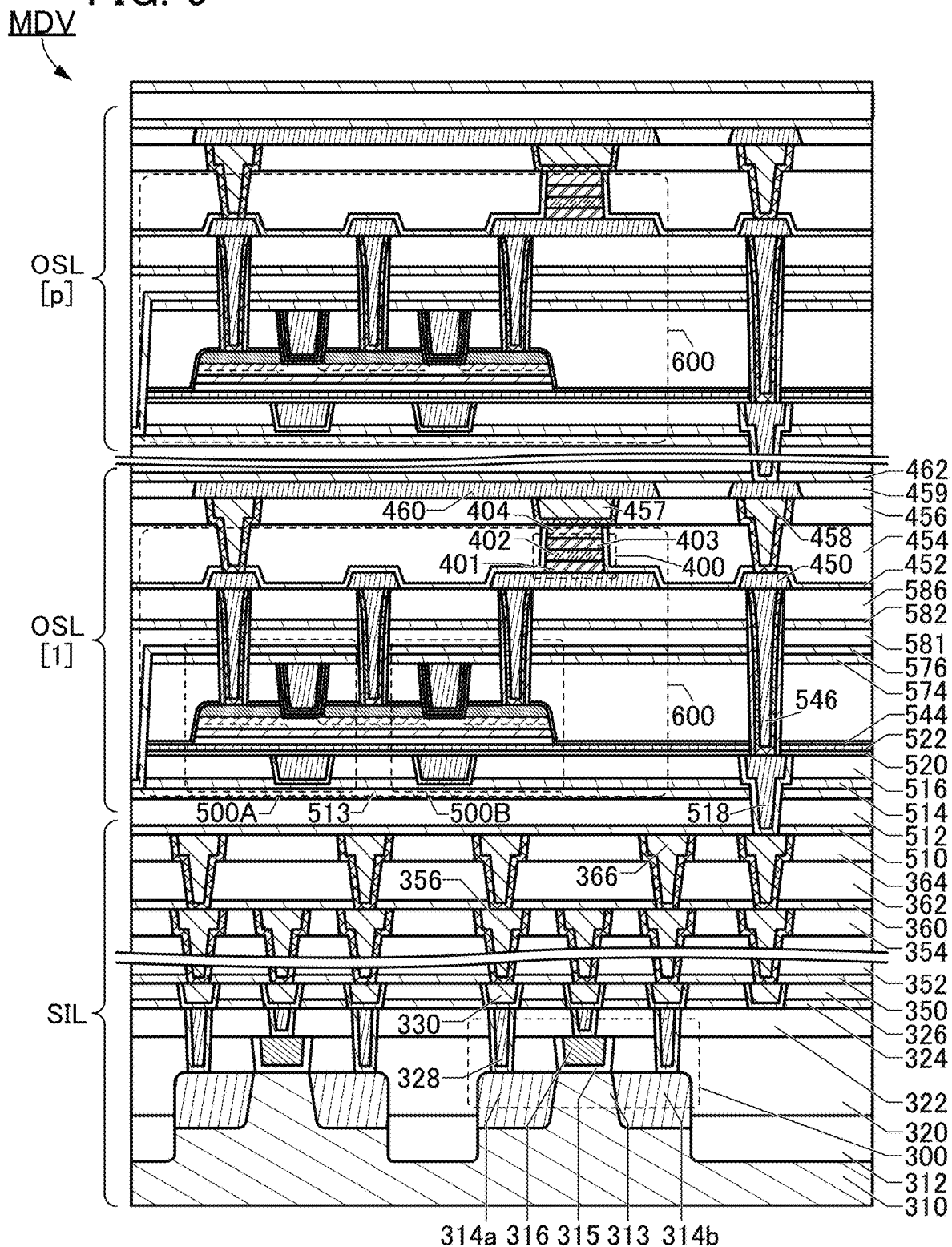
FIG. 9 is a schematic cross-sectional view illustrating a structure example of a memory device.

For example, the memory device MDV may have a structure such that the memory cell MC in FIG. 3C is employed for the memory cell 600. FIG. 9 illustrates a structure of the memory device MDV in which the memory cell MC in FIG. 3C is employed for the memory cell 600.

Specifically, the transistor 500A, the transistor 500B, and the memory element 400 in the memory device MDV in FIG. 9 correspond to the transistor M4, the transistor M3, and the variable resistance device MD in FIG. 3C.

In the memory device MDV in FIG. 9, the transistor 500A and the transistor 500B are formed so that the insulator 524, the oxide 530a, the oxide 530b, and one of the conductor 542a and the conductor 542b are shared therebetween. Two openings reaching the oxide 530 are provided in the insulator 580 and the conductor 542, and the oxide 530c, the insulator 550, and the conductor 560 are provided in each opening. Thus, one of the conductor 542a and the conductor 542b can be shared with the first terminal of the transistor 500A and the first terminal of the transistor 500B. The area where the transistor 500A and the transistor 500B are formed can be made smaller than the area in the case where the transistor 500A and the transistor 500B are separately formed. With the above structure, a region where the memory cell 600 is formed can be made small; accordingly, the area per bit as a bit density can be made small.

In the memory device MDV in FIG. 9, the first terminal of the transistor 500A is electrically connected to the first terminal of the transistor 500B, the second terminal of the transistor 500B is electrically connected to the first terminal of the memory element 400, and the second terminal of the memory element 400 is electrically connected to the second terminal of the transistor 500A.

The wiring SL in FIG. 3C can be, for example, the conductor 450 electrically connected to the first terminal of the transistor 500A and the first terminal of the transistor 500B. The wiring BL in FIG. 3C can be, for example, the conductor 450 electrically connected to the second terminal of the transistor 500B and the memory element 400.

The wiring WLa in FIG. 3C can be, for example, the conductor 560 corresponding to the gate of the transistor 500B. The wiring WLb in FIG. 3C can be, for example, the conductor 560 corresponding to the gate of the transistor 500A.

Figure 10:
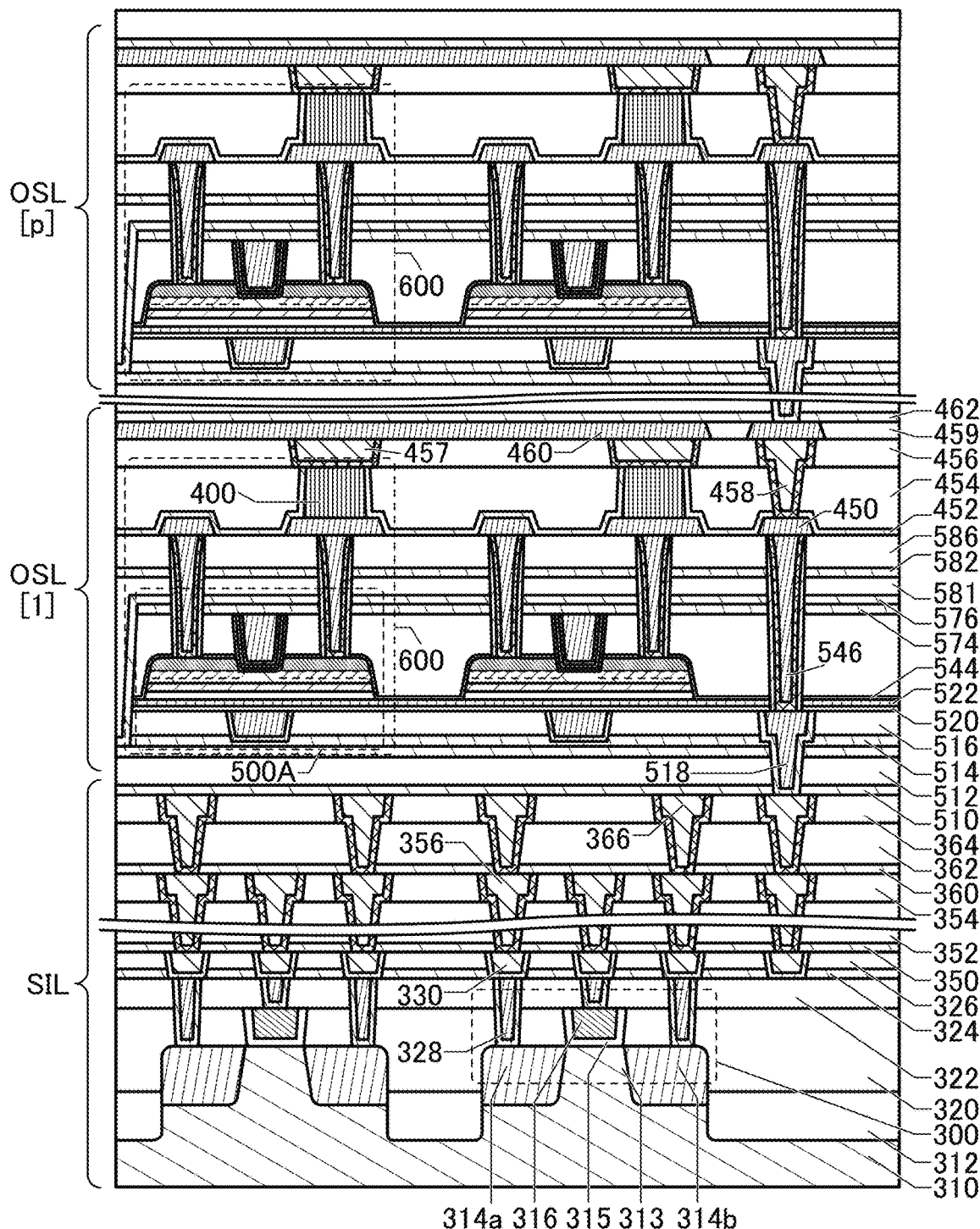
FIG. 10 is a schematic cross-sectional view illustrating a structure example of a memory device.

Furthermore, the memory device MDV may have such a structure that any of the memory cells MC in FIG. 6A to FIG. 6C can be used as the memory cell 600, for example. FIG. 10 shows the memory device MDV with such a structure that any of the memory cells MC in FIG. 6A to FIG. 6C is used as the memory cell 600.

Specifically, in the memory device MDV in FIG. 10, the transistor 500A corresponds to the transistor M10 in FIG. 6A to FIG. 6C, and the memory element 400 corresponds to the MTJ element in FIG. 6A, the variable resistor RM in FIG. 6B, the phase-change memory PCM1 in FIG. 6C, or the like. Thus, in the memory device MDV in FIG. 10, the first terminal of the transistor 500A is electrically connected to the first terminal of the memory element 400.

The wiring SL in each of FIG. 6A to FIG. 6C can be, for example, the conductor 450 electrically connected to the second terminal of the transistor 500A. The wiring BL in each of FIG. 6A to FIG. 6C can be, for example, the conductor 460 electrically connected to the second terminal of the memory element 400. The wiring WL in each of FIG. 6A to FIG. 6C can be, for example, the conductor 560 electrically connected to the gate of the transistor 500A.

The structure of the memory element 400 differs depending on which memory cell MC is selected from the structures in FIG. 6A to FIG. 6C. Thus, in the memory device MDV in FIG. 10, a portion where the memory element 400 is formed is vertically hatched. Furthermore, in FIG. 10, the insulator 452 is provided on the side surface of the memory element 400. However, depending on the structure of the memory element 400, the insulator 452 is not necessarily provided on the side surface of the memory element 400.

With use of the above structure for a memory device, the memory device can have low power consumption. Alternatively, a memory device having high storage capacity can be provided. Alternatively, a novel memory device can be provided.

Note that this embodiment can be combined with any of the other embodiments in this specification as appropriate.

Embodiment 3

Described in this embodiment is a metal oxide (hereinafter also referred to as an oxide semiconductor) that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structure>

First, classification of the crystal structures of an oxide semiconductor will be described using FIG. 11A. FIG. 11A is a diagram showing the classification of crystal structures of an oxide semiconductor, typically IGZO (a metal oxide containing In, Ga, and Zn).

As shown in FIG. 11A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (Cloud-Aligned Composite) (excluding single crystal and poly crystal). Note that the term "Crystalline" excludes single crystal, poly crystal, and completely amorphous. The term "Crystal" includes single crystal and poly crystal.

Note that the structures shown in the thick frame in FIG. 11A are in an intermediate state between "Amorphous" and "Crystal," and belong to a new crystalline phase. That is, these structures are completely different from "Amorphous", which is energetically unstable, and "Crystal".

A crystal structure of a film or a substrate can be analyzed with an X-ray diffraction (XRD) spectrum. FIG. 11B shows an XRD spectrum, which is obtained by GIXD (Grazing-Incidence XRD) measurement, of a CAAC-IGZO film classified into "Crystalline" (the vertical axis represents intensity in arbitrary unit (a. u.)). Note that a GIXD method is also referred to as a thin film method or a Seemann-Bohlin method. The XRD spectrum that is shown in FIG. 11B and obtained by GIXD measurement is hereinafter simply referred to as an XRD spectrum. The CAAC-IGZO film shown in FIG. 11B has a composition in the neighborhood of In:Ga:Zn=4:2:3 [atomic ratio]. In addition, the thickness of the CAAC-IGZO film shown in FIG. 11B is 500 nm.

As shown in FIG. 11B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. Note that as shown in FIG. 11B, the peak at 2θ of around 31° is asymmetric with respect to the axis of an angle at which peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 11C shows a diffraction pattern of the CAAC-IGZO film. FIG. 11C shows a diffraction pattern observed by NBED in which an electron beam is incident in a direction parallel to the substrate. Note that the CAAC-IGZO film shown in FIG. 11C has a composition in the vicinity of In:Ga:Zn=4:2:3 [atomic ratio]. In the nanobeam electron diffraction method, electron diffraction is performed with a probe diameter of 1 nm.

As shown in FIG. 11C, a plurality of spots indicating c-axis alignment are observed in the diffraction pattern of the CAAC-IGZO film.

<<Structure of Oxide Semiconductor>>

Note that oxide semiconductors might be classified in a manner different from that in FIG. 11A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called polycrystal. It is highly probable that the grain boundary becomes a recombination center and captures carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is unlikely to occur. Entry of impurities, formation of defects, or the like might decrease the crystallinity of an oxide semiconductor, which means that the CAAC-OS can be referred to as an oxide semiconductor having small amounts of impurities and defects (e.g., oxygen vacancies). Hence, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for an OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., greater than or equal to 1 nm and less than or equal to 30 nm).

[a-Like OS]

The a-like OS is an oxide semiconductor having a structure between those of the nc-OS and the amorphous oxide semiconductor. The a-like OS includes a void or a low-density region. That is, the a-like OS has lower crystallinity than the nc-OS and the CAAC-OS. Moreover, the a-like OS has higher hydrogen concentration in the film than the nc-OS and the CAAC-OS.

<<Composition of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current ($I_{on}$), high field-effect mobility ($\mu$), and excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor with a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$ and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained using SIMS, is set lower than or equal to $1\times10^{18}$ atoms/cm$^3$, preferably lower than or equal to $2\times10^{16}$ atoms/cm$^3$.

When the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained using SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained using SIMS, is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

Note that this embodiment can be combined with any of the other embodiments in this specification as appropriate.

Embodiment 4

In this embodiment, examples of a semiconductor wafer where the memory device or the like described in the above embodiment is formed and electronic components incorporating the memory device will be described.

<Semiconductor Wafer>

First, an example of a semiconductor wafer where a memory device or the like is formed is described with reference to FIG. 12A.

Figure 12A:
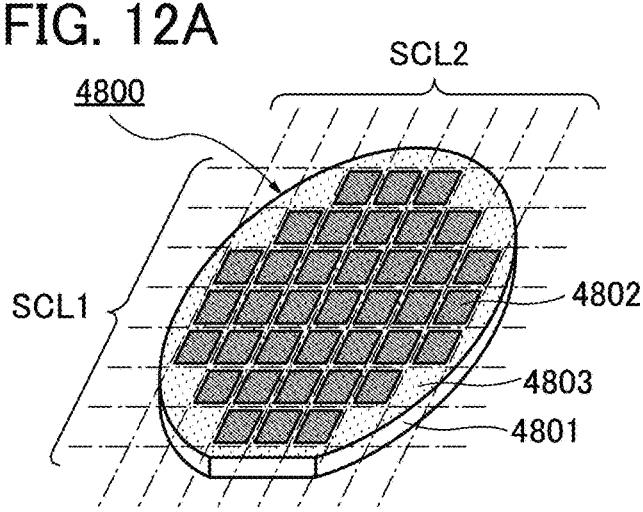
FIG. 12A is a perspective view illustrating an example of a semiconductor wafer.

A semiconductor wafer 4800 illustrated in FIG. 12A includes a wafer 4801 and a plurality of circuit portions 4802 provided on the top surface of the wafer 4801. A portion without the circuit portions 4802 on the top surface of the wafer 4801 is a spacing 4803 that is a region for dicing.

The semiconductor wafer 4800 can be formed by forming the plurality of circuit portions 4802 on the surface of the wafer 4801 by a pre-process. After that, a surface of the wafer 4801 opposite to the surface provided with the plurality of circuit portions 4802 may be ground to thin the wafer 4801. Through this step, warpage or the like of the wafer 4801 is reduced and the size of the component can be reduced.

Next, a dicing step is performed. The dicing is performed along scribe lines SCL1 and scribe lines SCL2 (referred to as dicing lines or cutting lines in some cases) indicated by dashed-dotted lines. To perform the dicing step easily, the spacing 4803 is preferably arranged such that a plurality of scribe lines SCL1 are parallel to each other, a plurality of scribe lines SCL2 are parallel to each other, and the scribe lines SCL1 and the scribe lines SCL2 intersect each other perpendicularly.

Figure 12B:
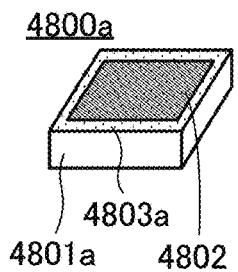
FIG. 12B is a perspective view illustrating an example of a chip.

With the dicing step, a chip 4800a as illustrated in FIG. 12B can be cut out from the semiconductor wafer 4800. The chip 4800a includes a wafer 4801a, the circuit portion 4802, and a spacing 4803a. Note that it is preferable to make the spacing 4803a as small as possible. In this case, the width of the spacing 4803 between adjacent circuit portions 4802 is substantially the same as a cutting allowance of the scribe line SCL1 or a cutting allowance of the scribe line SCL2.

Note that the shape of the element substrate of one embodiment of the present invention is not limited to the shape of the semiconductor wafer 4800 illustrated in FIG. 12A. The element substrate may be a rectangular semiconductor wafer, for example. The shape of the element substrate can be changed as appropriate, depending on a manufacturing process of an element and an apparatus for manufacturing the element.

<Electronic Component>

Figure 12C:
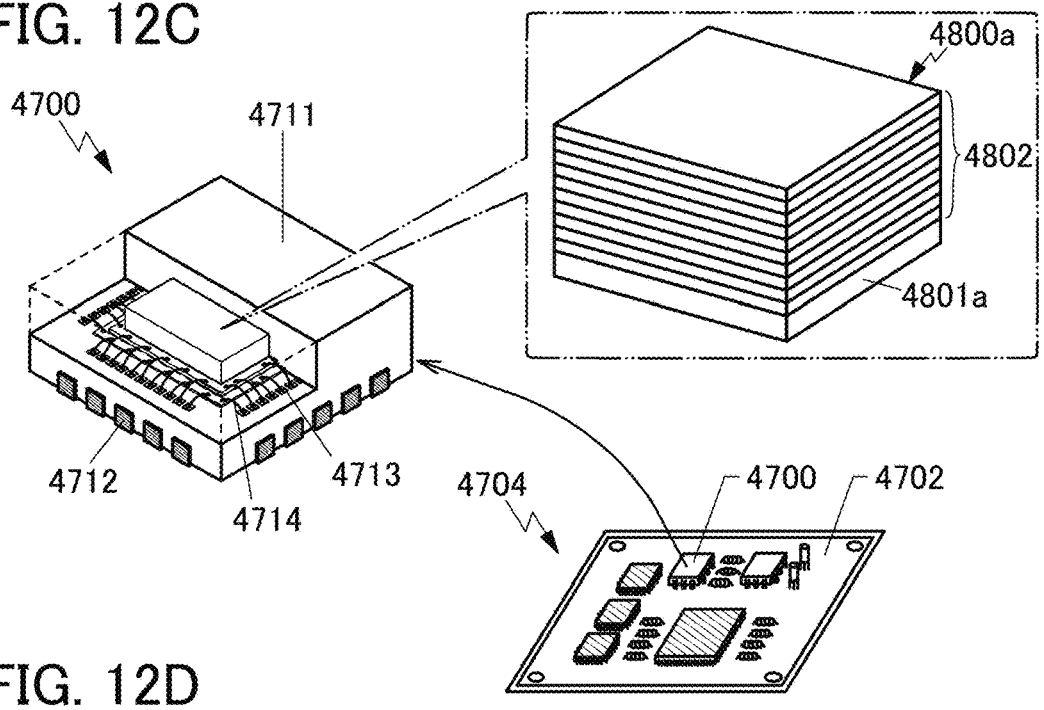
FIG. 12C and FIG. 12D are perspective views illustrating examples of electronic components.

FIG. 12C is a perspective view of an electronic component 4700 and a substrate (a mounting board 4704) on which the electronic component 4700 is mounted. The electronic component 4700 illustrated in FIG. 12C includes the chip 4800a in a mold 4711. Note that the chip 4800a illustrated in FIG. 12C is shown to have a structure in which the circuit portions 4802 are stacked. That is, the memory device described in the above embodiment can be used for the circuit portion 4802. To illustrate the inside of the electronic component 4700, some portions are omitted in FIG. 12C. The electronic component 4700 includes a land 4712 outside the mold 4711. The land 4712 is electrically connected to an electrode pad 4713, and the electrode pad 4713 is electrically connected to the chip 4800a via a wire 4714. The electronic component 4700 is mounted on a printed circuit board 4702, for example. A plurality of such electronic components are combined and electrically connected to each other on the printed circuit board 4702; thus, the mounting board 4704 is completed.

Figure 12D:
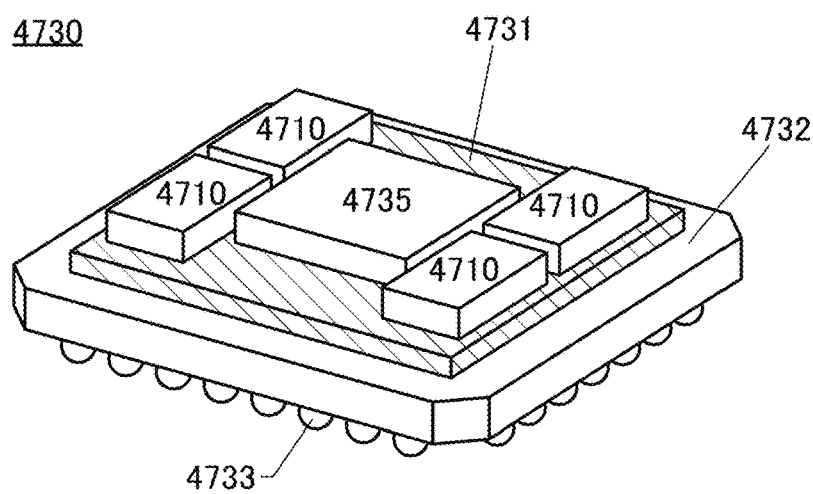

FIG. 12D is a perspective view of an electronic component 4730. The electronic component 4730 is an example of an SiP (System in package) or an MCM (Multi Chip Module). In the electronic component 4730, an interposer 4731 is provided over a package substrate 4732 (a printed circuit board), and a semiconductor device 4735 and a plurality of semiconductor devices 4710 are provided over the interposer 4731.

The electronic component 4730 includes the semiconductor devices 4710. Examples of the semiconductor device 4710 include the memory device described in the above embodiment and a high bandwidth memory (HBM). Moreover, an integrated circuit (a semiconductor device) such as a CPU, a GPU, an FPGA, or a memory device can be used as the semiconductor device 4735.

As the package substrate 4732, a ceramic substrate, a plastic substrate, a glass epoxy substrate, or the like can be used. As the interposer 4731, a silicon interposer, a resin interposer, or the like can be used.

The interposer 4731 includes a plurality of wirings and has a function of electrically connecting a plurality of integrated circuits with different terminal pitches. The plurality of wirings have a single-layer structure or a multi-layer structure. The interposer 4731 has a function of electrically connecting an integrated circuit provided on the interposer 4731 to an electrode provided on the package substrate 4732. Accordingly, the interposer is sometimes referred to as a redistribution substrate or an intermediate substrate. A through electrode may be provided in the interposer 4731 and used to electrically connect the integrated circuit and the package substrate 4732. In the case of using a silicon interposer, a TSV (Through Silicon Via) can also be used as the through electrode.

A silicon interposer is preferably used as the interposer 4731. The silicon interposer can be manufactured at lower cost than an integrated circuit because the silicon interposer need not to be provided with an active element. Meanwhile, since wirings of the silicon interposer can be formed through a semiconductor process, the formation of minute wirings, which is difficult for a resin interposer, is easily achieved.

An HBM needs to be connected to many wirings to achieve a wide memory bandwidth. Therefore, minute wirings are required to be formed densely on an interposer on which an HBM is mounted. For this reason, a silicon interposer is preferably used as the interposer on which an HBM is mounted.

In a SiP, an MCM, or the like using a silicon interposer, a decrease in reliability due to a difference in expansion coefficient between an integrated circuit and the interposer is less likely to occur. Furthermore, the surface of a silicon interposer has high planarity, so that a poor connection between the silicon interposer and an integrated circuit provided thereon is less likely to occur. It is particularly preferable to use a silicon interposer for a 2.5D package (2.5D mounting) in which a plurality of integrated circuits are arranged side by side on an interposer.

A heat sink (radiator plate) may be provided to overlap with the electronic component 4730. When a heat sink is provided, the heights of integrated circuits provided on the interposer 4731 are preferably the same. For example, in the electronic component 4730 described in this embodiment, the heights of the semiconductor devices 4710 and the semiconductor device 4735 are preferably the same.

An electrode 4733 may be provided on the bottom of the package substrate 4732 to mount the electronic component 4730 on another substrate. FIG. 12D illustrates an example in which the electrode 4733 is formed of a solder ball. Solder balls are provided in a matrix on the bottom of the package substrate 4732, whereby a BGA (Ball Grid Array) can be achieved. Alternatively, the electrode 4733 may be formed of a conductive pin. When conductive pins are provided in a matrix on the bottom of the package substrate 4732, a PGA (Pin Grid Array) can be achieved.

The electronic component 4730 can be mounted on another substrate in a variety of manners other than a BGA and a PGA. For example, an SPGA (Staggered Pin Grid Array), an LGA (Land Grid Array), a QFP (Quad Flat Package), a QFJ (Quad Flat J-leaded package), or a QFN (Quad Flat Non-leaded package) can be employed.

Note that this embodiment can be combined with any of the other embodiments in this specification as appropriate.

Embodiment 5

In this embodiment, a CPU that can include the memory device of the above embodiment will be described.

Figure 13:
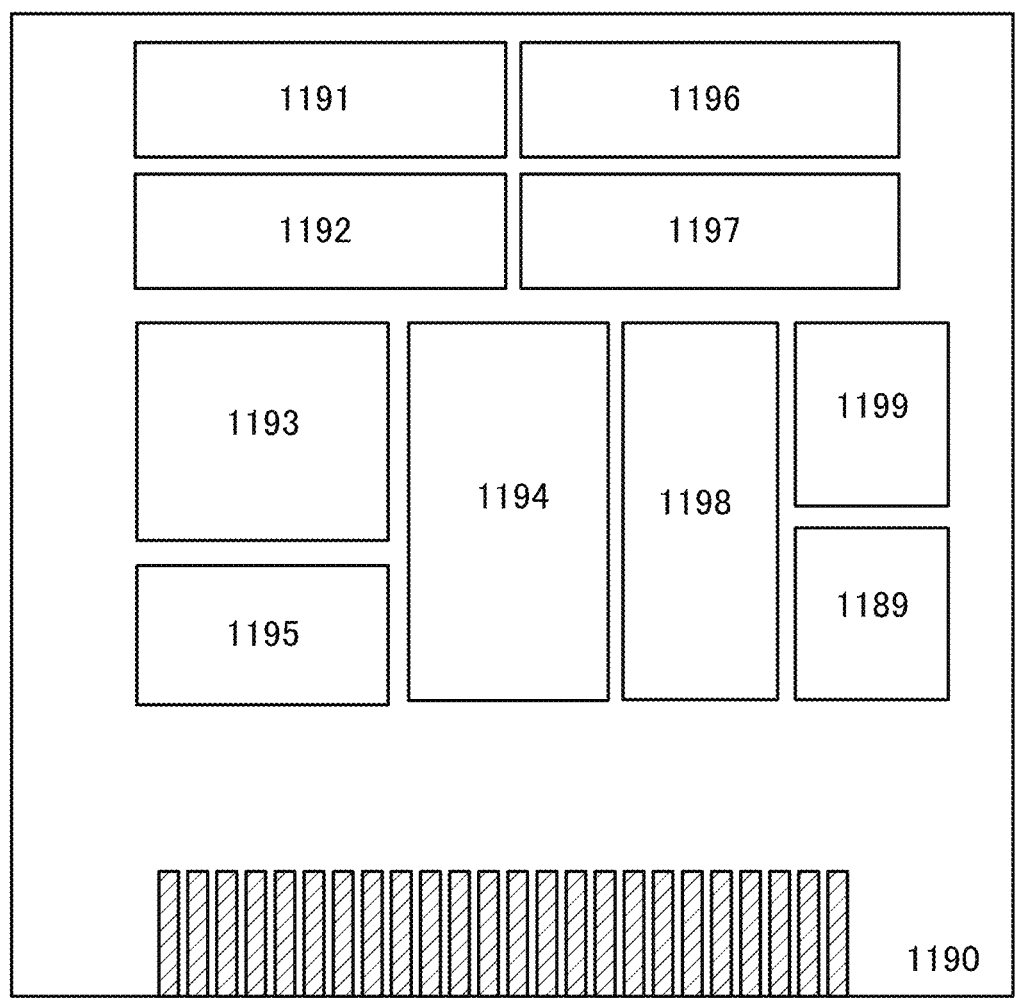
FIG. 13 is a block diagram illustrating a CPU.

FIG. 13 is a block diagram illustrating a configuration example of a CPU in part of which the memory device described in the above embodiment is used.

The CPU illustrated in FIG. 13 includes an ALU 1191 (ALU: Arithmetic logic unit), an ALU controller 1192, an instruction decoder 1193, an interrupt controller 1194, a timing controller 1195, a register 1196, a register controller 1197, a bus interface 1198 (Bus I/F), a rewritable ROM 1199, and a ROM interface 1189 (ROM I/F) over a substrate 1190. A semiconductor substrate, an SOI substrate, a glass substrate, or the like is used as the substrate 1190. The ROM 1199 and the ROM interface 1189 may be provided over separate chips. Needless to say, the CPU illustrated in FIG. 13 is just an example of a simplified configuration, and an actual CPU may have a variety of configurations depending on the usage. For example, the CPU may have a configuration in which a configuration including the CPU illustrated in FIG. 13 or an arithmetic circuit is considered as one core, a plurality of the cores are included, and the cores operate in parallel, namely a configuration like that of a GPU. The number of bits that the CPU can process in an internal arithmetic circuit or in a data bus can be 8, 16, 32, or 64, for example.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 judges an interrupt request from an external input/output device, a peripheral circuit, or the like on the basis of its priority or a mask state, and processes the request. The register controller 1197 generates an address of the register 1196, and reads/writes data from/to the register 1196 in accordance with the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal on the basis of a reference clock signal, and supplies the internal clock signal to the above circuits.

In the CPU illustrated in FIG. 13, a memory cell is provided in the register 1196. The memory device described in any of the above embodiments can be included in the register 1196, for example.

In the CPU illustrated in FIG. 13, the register controller 1197 selects a retaining operation in the register 1196 in accordance with an instruction from the ALU 1191. That is, the register controller 1197 selects whether data is held by a flip-flop or by a capacitor in a memory cell included in the register 1196. When data retention by the flip-flop is selected, power supply voltage is supplied to the memory cell in the register 1196. When data retention by the capacitor is selected, the data is rewritten into the capacitor, and supply of power supply voltage to the memory cell in the register 1196 can be stopped.

Note that this embodiment can be combined with any of the other embodiments in this specification as appropriate.

Embodiment 6

In this embodiment, examples of electronic devices each including the memory device described in the above embodiment will be described. FIG. 14A to FIG. 14J and FIG. 15A to FIG. 15E show electronic devices each of which includes the electronic component 4700 including the memory device.

[Mobile Phone]

Figure 14A:
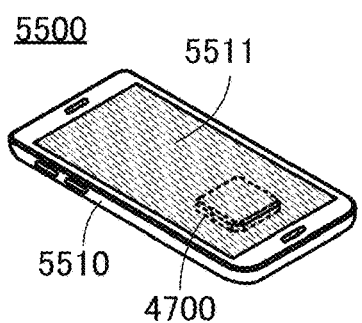
FIG. 14A to FIG. 14J are each a perspective view or a schematic view illustrating an example of a product.

An information terminal 5500 illustrated in FIG. 14A is a mobile phone (a smartphone), which is a type of information terminal. The information terminal 5500 includes a housing 5510 and a display portion 5511. As input interfaces, a touch panel and a button are provided in the display portion 5511 and the housing 5510, respectively.

By using the memory device described in the above embodiment, the information terminal 5500 can retain a temporary file generated at the time of executing an application (e.g., a web browser's cache).

[Wearable Terminal]

Figure 14B:
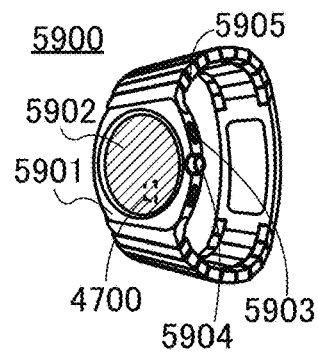

FIG. 14B illustrates an information terminal 5900 as an example of a wearable terminal. The information terminal 5900 includes a housing 5901, a display portion 5902, an operation button 5903, an operator 5904, a band 5905, and the like.

Like the information terminal 5500 described above, the wearable terminal can retain a temporary file generated at the time of executing an application by using the memory device described in the above embodiment.

[Information Terminal]

Figure 14C:
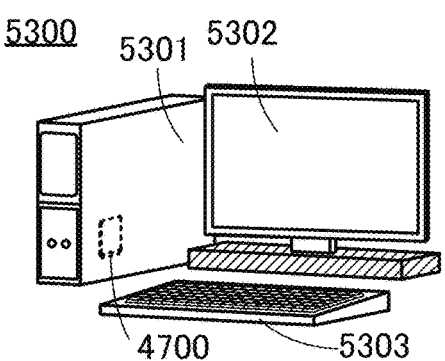

FIG. 14C illustrates a desktop information terminal 5300. The desktop information terminal 5300 includes a main body 5301 of the information terminal, a display 5302, and a keyboard 5303.

Like the information terminal 5500 described above, the desktop information terminal 5300 can retain a temporary file generated at the time of executing an application by using the memory device described in the above embodiment.

Note that although FIG. 14A to FIG. 14C illustrate a smartphone, a wearable terminal, and a desktop information terminal as examples of the electronic device, one embodiment of the present invention can also be applied to an information terminal other than a smartphone, a wearable terminal, and a desktop information terminal. Examples of information terminals other than a smartphone, a wearable terminal, and a desktop information terminal include a PDA (Personal Digital Assistant), a laptop information terminal, and a workstation.

[Consumer Electronics]

Figure 14D:
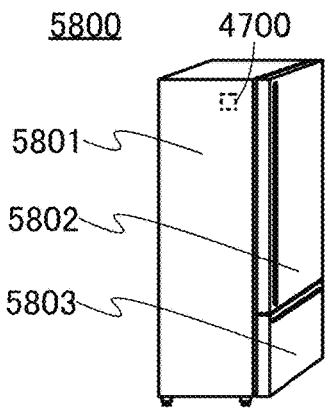

FIG. 14D illustrates an electric refrigerator-freezer 5800 as an example of consumer electronics. The electric refrigerator-freezer 5800 includes a housing 5801, a refrigerator door 5802, a freezer door 5803, and the like.

When the memory device described in the above embodiment is used in the electric refrigerator-freezer 5800, the electric refrigerator-freezer 5800 can be used for IoT (Internet of Things), for example. When used for IoT, the electric refrigerator-freezer 5800 can send and receive data on food stored in the electric refrigerator-freezer 5800 and food expiration dates, for example, to/from the above-described information terminal and the like via the Internet. When sending the data, the electric refrigerator-freezer 5800 can retain the data as a temporary file in the meory device.

Here, an electric refrigerator-freezer is described as an example of consumer electronics, other examples of consumer electronics include a vacuum, a microwave oven, an electric oven, a rice cooker, a water heater, an IH cooker, a water server, a heating-cooling combination appliance such as an air conditioner, a washing machine, a drying machine, and an audio visual appliance.

[Game Machines]

Figure 14E:
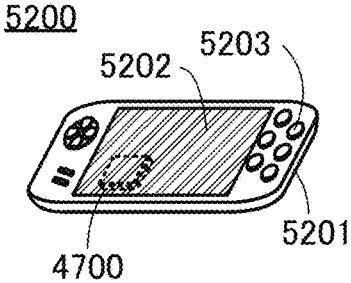

FIG. 14E illustrates a portable game machine 5200 as an example of a game machine. The portable game machine 5200 includes a housing 5201, a display portion 5202, a button 5203, and the like.

Figure 14F:
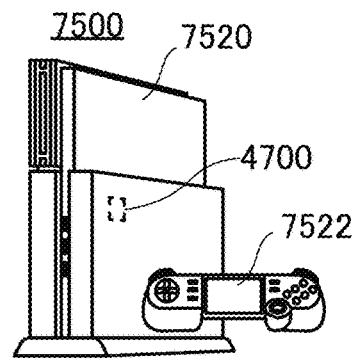

FIG. 14F illustrates a stationary game machine 7500 as another example of a game machine. The stationary game machine 7500 includes a main body 7520 and a controller 7522. The controller 7522 can be connected to the main body 7520 with or without a wire. Although not illustrated in FIG. 14F, the controller 7522 can include a display portion that displays a game image, and an input interface besides a button, such as a touch panel, a stick, a rotating knob, and a sliding knob, for example. The shape of the controller 7522 is not limited to that in FIG. 14F and may be changed variously in accordance with the genres of games. For example, in a shooting game such as an FPS (First Person Shooter), a gun-shaped controller having a trigger button can be used. As another example, in a music game or the like, a controller having a shape of a music instrument, audio equipment, or the like can be used. Furthermore, the stationary game machine may include a camera, a depth sensor, a microphone, and the like so that the game player can play a game using a gesture and/or a voice instead of a controller.

Videos displayed on the game machine can be output with a display device such as a television device, a personal computer display, a game display, and a head-mounted display.

When the memory device described in the above embodiment is used in the portable game machine 5200 and the stationary game machine 7500, the portable game machine 5200 with low power consumption can be achieved. Furthermore, heat generation from a circuit can be reduced owing to low power consumption; thus, the influence of heat generation on the circuit itself, the peripheral circuit, and the module can be reduced.

Moreover, with use of the memory device described in the above embodiment, the portable game machine 5200 and the stationary game machine 7500 can hold a temporary file necessary for arithmetic operation that occurs during game play.

Although FIG. 14E and FIG. 14F illustrate the portable game machine and the stationary game machine as examples of game machines, the electronic device of one embodiment of the present invention is not limited thereto. Other examples of the electronic device of one embodiment of the present invention include an arcade game machine installed in an entertainment facility (e.g., a game center and an amusement park) and a throwing machine for batting practice, installed in sports facilities.

[Moving Vehicle]

The memory device described in the above embodiment can be used for an automobile, which is a moving vehicle, and around the driver's seat in an automobile.

Figure 14G:
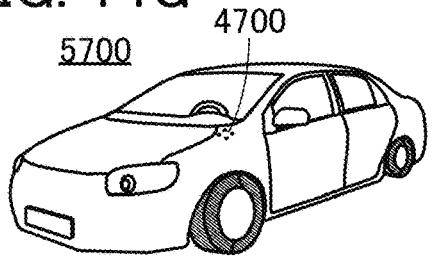

FIG. 14G illustrates an automobile 5700 that is an example of a moving vehicle.

An instrument panel that provides various kinds of information by displaying a speedometer, a tachometer, a mileage, a fuel meter, a gearshift indicator, air-conditioning settings, and the like is provided around the driver's seat in the automobile 5700. In addition, a display device showing the above information may be provided around the driver's seat.

In particular, the display device can compensate for the view obstructed by the pillar or the like, the blind areas for the driver's seat, and the like by displaying a video taken by an imaging device (not illustrated) provided for the automobile 5700, thereby providing a high level of safety.

The memory device described in the above embodiment can temporarily retain data; thus, the memory device can be used to retain temporary data necessary in an automatic driving system for the automobile 5700 and a system for navigation and risk prediction, for example. The display device may be configured to display temporary information regarding navigation, risk prediction, or the like. Moreover, the memory device may be configured to retain a video of a driving recorder provided in the automobile 5700.

Note that although an automobile is described above as an example of the moving vehicle, the moving vehicle is not limited to an automobile. Examples of moving vehicles include a train, a monorail train, a ship, a flying object (a helicopter, an unmanned aircraft (a drone), an airplane, and a rocket), and the like.

[Camera]

The memory device described in the above embodiment can be employed for a camera.

Figure 14H:
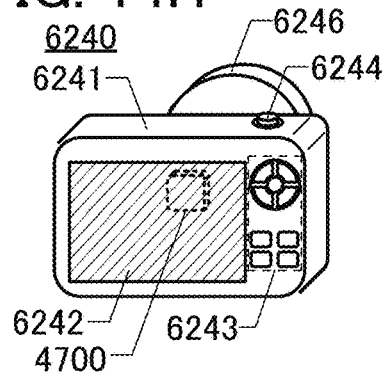

FIG. 14H illustrates a digital camera 6240 that is an example of an imaging device. The digital camera 6240 includes a housing 6241, a display portion 6242, operation buttons 6243, a shutter button 6244, and the like, and a detachable lens 6246 is attached to the digital camera 6240. Here, the lens 6246 of the digital camera 6240 is detachable from the housing 6241 for replacement; alternatively, the lens 6246 may be incorporated into the housing 6241. Moreover, the digital camera 6240 can be additionally equipped with a stroboscope, a viewfinder, or the like.

When the memory device described in the above embodiment is employed for the digital camera 6240, the digital camera 6240 with low power consumption can be achieved. Furthermore, heat generation from a circuit can be reduced owing to low power consumption; thus, the influence of heat generation on the circuit itself, the peripheral circuit, and the module can be reduced.

[Video Camera]

The memory device described in the above embodiment can be employed for a video camera.

Figure 14I:
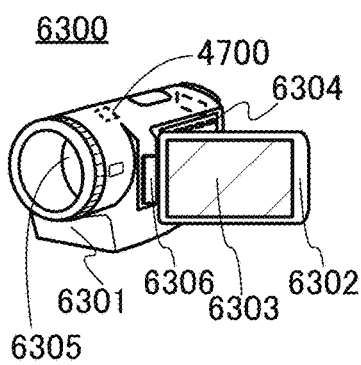

FIG. 14I illustrates a video camera 6300 that is an example of an imaging device. The video camera 6300 includes a first housing 6301, a second housing 6302, a display portion 6303, operation keys 6304, a lens 6305, a joint 6306, and the like. The operation keys 6304 and the lens 6305 are provided in the first housing 6301, and the display portion 6303 is provided in the second housing 6302. The first housing 6301 and the second housing 6302 are connected to each other with the joint 6306, and the angle between the first housing 6301 and the second housing 6302 can be changed with the joint 6306. Videos displayed on the display portion 6303 may be switched in accordance with the angle at the joint 6306 between the first housing 6301 and the second housing 6302.

When a video taken by the video camera 6300 is recorded, the video needs to be encoded based on a data recording format. With use of the above memory device, the video camera 6300 can retain a temporary file generated in encoding.

[ICD]

The memory device described in the above embodiment can be employed for an implantable cardioverter-defibrillator (ICD).

Figure 14J:
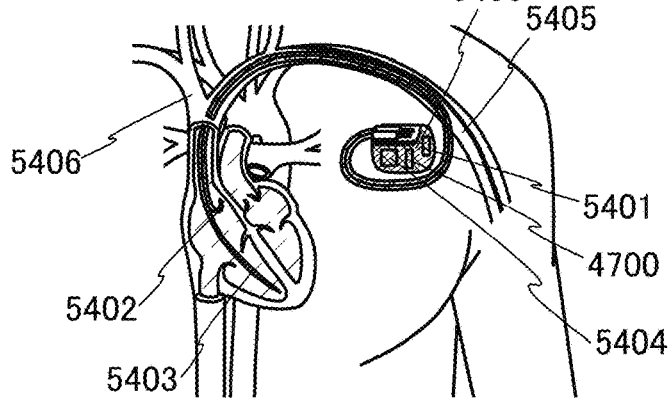

FIG. 14(J) is a schematic cross-sectional view showing an example of an ICD. An ICD main unit 5400 includes at least a battery 5401, the electronic component 4700, a regulator, a control circuit, an antenna 5404, a wire 5402 reaching a right atrium, and a wire 5403 reaching a right ventricle.

The ICD main unit 5400 is implanted in the body by surgery, and the two wires pass through a subclavian vein 5405 and a superior vena cava 5406 of the human body, with the end of one of the wires placed in the right ventricle and the end of the other wire placed in the right atrium.

The ICD main unit 5400 functions as a pacemaker and paces the heart when the heart rate is not within a predetermined range. When the heart rate is not recovered by pacing (e.g., when ventricular tachycardia or ventricular fibrillation occurs), treatment with an electrical shock is performed.

The ICD main unit 5400 needs to monitor the heart rate all the time in order to perform pacing and deliver electrical shocks as appropriate. For that reason, the ICD main unit 5400 includes a sensor for measuring the heart rate. In addition, in the ICD main unit 5400, data on the heart rate obtained by the sensor or the like, the number of times the treatment with pacing is performed, and the time taken for the treatment, for example, can be stored in the electronic component 4700.

In addition, the antenna 5404 can receive power, and the battery 5401 is charged with the power. Furthermore, when the ICD main unit 5400 includes a plurality of batteries, safety can be increased. Specifically, even when one of the batteries in the ICD main unit 5400 is dead, the other batteries can function properly; thus, the batteries also function as an auxiliary power source.

In addition to the antenna 5404 capable of receiving power, an antenna that can transmit physiological signals may be included to construct, for example, a system that monitors cardiac activity by checking physiological signals such as a pulse, a respiratory rate, a heart rate, and body temperature with an external monitoring device.

[Expansion Device for PC]

The memory device described in the above embodiment can be employed for a calculator such as a PC (Personal Computer) and an expansion device for an information terminal.

Figure 15A:
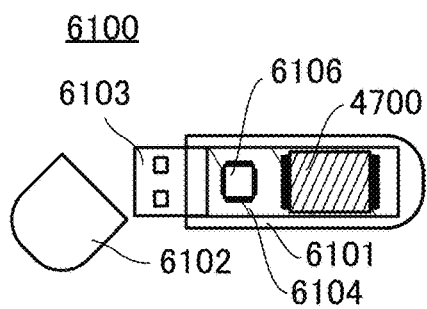
FIG. 15A to FIG. 15E are a perspective view and schematic views illustrating examples of a product.

FIG. 15A illustrates, as an example of the expansion device, a portable expansion device 6100 that is externally attached to a PC and includes a chip capable of storing information. When the expansion device 6100 is connected to a PC with a USB (Universal Serial Bus), for example, data can be stored in the chip. FIG. 15A illustrates the portable expansion device 6100; however, the expansion device of one embodiment of the present invention is not limited to this and may be a relatively large expansion device including a cooling fan or the like, for example.

The expansion device 6100 includes a housing 6101, a cap 6102, a USB connector 6103, and a substrate 6104. The substrate 6104 is held in the housing 6101. The substrate 6104 is provided with a circuit for driving the memory device or the like described in the above embodiment. For example, the substrate 6104 is provided with the electronic component 4700 and a controller chip 6106. The USB connector 6103 functions as an interface for connection to an external device.

[SD Card]

The memory device described in the above embodiment can be used in an SD card that can be attached to electronic devices such as an information terminal and a digital camera.

Figure 15B:
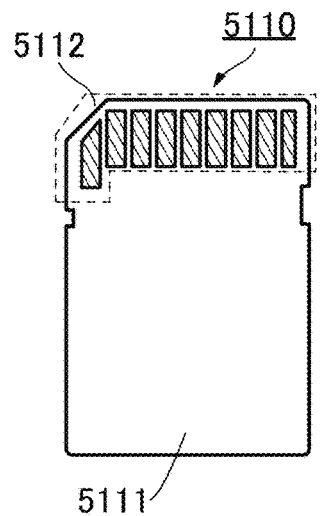
Figure 15C:
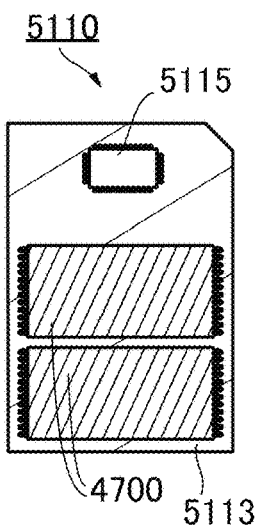

FIG. 15B is a schematic external diagram of an SD card, and FIG. 15C is a schematic diagram illustrating the internal structure of the SD card. An SD card 5110 includes a housing 5111, a connector 5112, and a substrate 5113. The connector 5112 functions as an interface for connection to an external device. The substrate 5113 is held in the housing 5111. The substrate 5113 is provided with a memory device and a circuit for driving the memory device. For example, the substrate 5113 is provided with the electronic component 4700 and a controller chip 5115. Note that the circuit configurations of the electronic component 4700 and the controller chip 5115 are not limited to those described above and can be changed as appropriate depending on circumstances. For example, a write circuit, a row driver, a read circuit, and the like that are provided in an electronic component may be incorporated into the controller chip 5115 instead of the electronic component 4700.

When the electronic component 4700 is also provided on the back side of the substrate 5113, the capacity of the SD card 5110 can be increased. In addition, a wireless chip with a radio communication function may be provided on the substrate 5113. This enables wireless communication between an external device and the SD card 5110, making it possible to write/read data to/from the electronic component 4700.

[SSD]

The memory device described in the above embodiment can be used in an SSD (Solid State Drive) that can be attached to electronic devices such as information terminals.

Figure 15D:
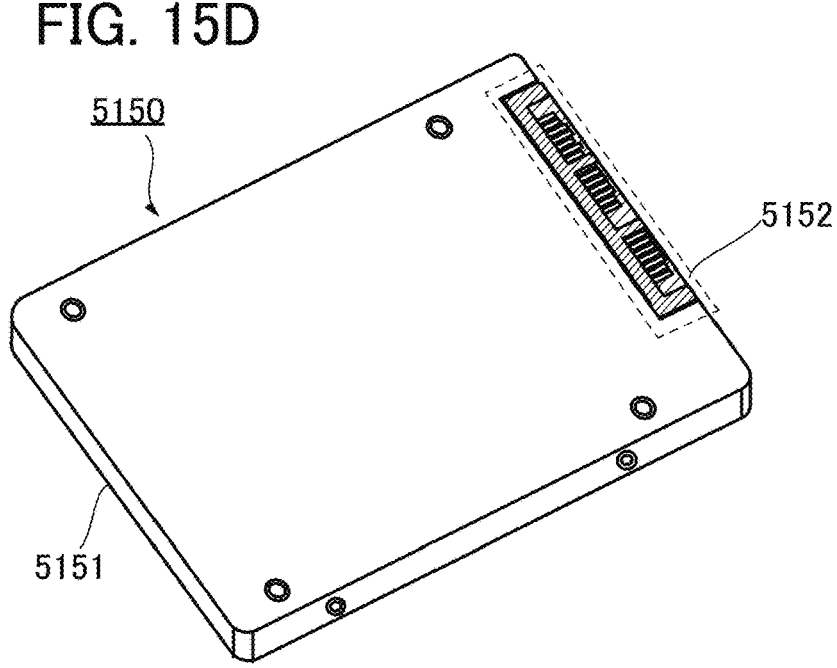
Figure 15E:
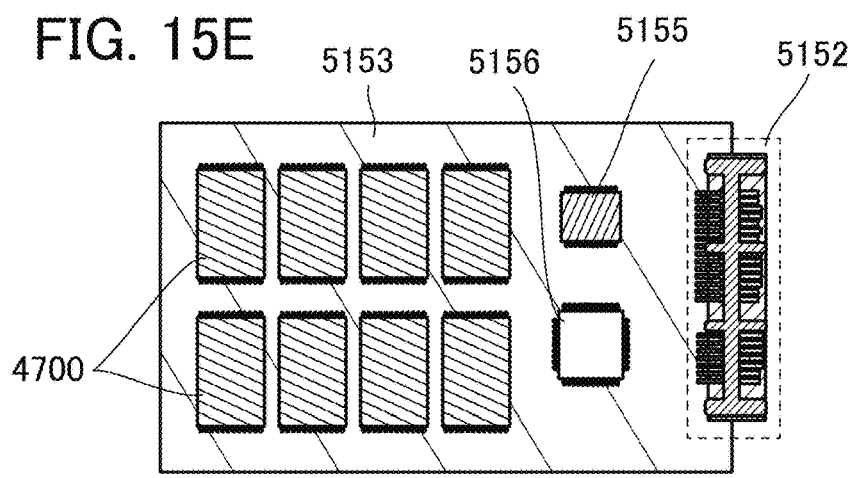

FIG. 15D is a schematic external diagram of an SSD, and FIG. 15E is a schematic diagram of the internal structure of the SSD. An SSD 5150 includes a housing 5151, a connector 5152, and a substrate 5153. The connector 5152 functions as an interface for connection to an external device. The substrate 5153 is held in the housing 5151. The substrate 5153 is provided with a memory device and a circuit for driving the memory device. For example, the substrate 5153 is provided with the electronic component 4700, a memory chip 5155, and a controller chip 5156. When the electronic component 4700 is also provided on the back side of the substrate 5153, the capacity of the SSD 5150 can be increased. A work memory is incorporated into the memory chip 5155. For example, a DRAM chip can be used as the memory chip 5155. A processor, an ECC circuit, and the like are incorporated into the controller chip 5156. Note that the circuit configurations of the electronic components 4700, the memory chip 5155, and the controller chip 5156 are not limited to those described above, and the circuit configurations can be changed as appropriate according to circumstances. For example, a memory functioning as a work memory may also be provided in the controller chip 5156.

The memory device described in Embodiment 1 or Embodiment 2 is used for memory devices included in the above electronic devices, whereby novel electronic devices can be provided.

Note that this embodiment can be combined with any of the other embodiments in this specification as appropriate.

REFERENCE NUMERALS

MDV: memory device, MCA: memory cell array, MCA[1]: memory cell array, MCA[p−1]: memory cell array, MCA[p]: memory cell array, PHL: peripheral circuit, MC: memory cell, MC[1,1]: memory cell, MC[m,1]: memory cell, MC[1,n]: memory cell, MC[m,n]: memory cell, BD: circuit, WD: circuit, SD: circuit, RBD: circuit, CLC: circuit, OPC: circuit, M1: transistor, M2: transistor, M3: transistor, M4: transistor, M10: transistor, MD: variable resistance device, ME: MTJ element, RM: variable resistor, PCM1: phase-change memory, IT1: terminal, IT2: terminal, OT: terminal, BL1: wiring, BL1[1]: wiring, BL1[$n$]: wiring, BL2: wiring, BL2[1]: wiring, BL2[$n$]: wiring, WL: wiring, WLa: wiring, WLa[1]: wiring, WLa[m]: wiring, WLb: wiring, WLb[1]: wiring, WLb[m]: wiring, WL[1]: wiring, WL[m]: wiring, RBL: wiring, RBL[1]: wiring, RBL[m]: wiring, SL[1]: wiring, SL[m]: wiring, BGE: wiring, RL: layer, TIS: layer, FL: layer, CA: layer, TE: electrode, CHL: phase-change layer, BE: electrode, SIL: layer, OSL[1]: layer, OSL[p]: layer, 300: transistor, 310: substrate, 312: element isolation layer, 313: semiconductor region, 314*a*: low-resistance region, 314*b*: low-resistance region, 315: insulator, 316: conductor, 320: insulator, 322: insulator, 324: insulator, 326:

insulator, 328: conductor, 330: conductor, 350: insulator, 352: insulator, 354: insulator, 356: conductor, 360: insulator, 362: insulator, 364: insulator, 366: conductor, 400: memory element, 401: conductor, 402: insulator, 403: conductor, 404: conductor, 450: conductor, 452: insulator, 454: insulator, 456: insulator, 457: conductor, 458: conductor, 459: insulator, 460: conductor, 462: insulator, 500A: transistor, 500B: transistor, 503: conductor, 503*a*: conductor, 503*b*: conductor, 510: insulator, 512: insulator, 513: insulator, 514: insulator, 516: insulator, 518: conductor, 520: insulator, 522: insulator, 524: insulator, 530: oxide, 530*a*: oxide, 530*b*: oxide, 530*c*: oxide, 540*a*: conductor, 540*b*: conductor, 542: conductor, 542*a*: conductor, 542*b*: conductor, 543*a*: region, 543*b*: region, 544: insulator, 546: conductor, 550: insulator, 552: insulator, 560: conductor, 560*a*: conductor, 560*b*: conductor, 574: insulator, 576: insulator, 580: insulator, 581: insulator, 582: insulator, 586: insulator, 600: memory cell, 1189: ROM interface, 1190: substrate, 1191: ALU, 1192: ALU controller, 1193: instruction decoder, 1194: interrupt controller, 1195: timing controller, 1196: register, 1197: register controller, 1198: bus interface, 2621: row decoder, 2622: word line driver circuit, 2630: bit line driver circuit, 2631: column decoder, 2632: precharge circuit, 2633: sense amplifier, 2634: write circuit, 2640: output circuit, 2660: control logic circuit, 4700: electronic component, 4702: printed circuit board, 4704: mounting board, 4710: semiconductor device, 4714: wire, 4730: electronic component, 4731: interposer, 4732: package substrate, 4733: electrode, 4735: semiconductor device, 4800: semiconductor wafer, 4800*a*: chip, 4801: wafer, 4801*a*: wafer, 4802: circuit portion, 4803: spacing, 4803*a*: spacing, 5110: SD card, 5111: housing, 5112: connector, 5113: substrate, 5115: controller chip, 5150: SSD, 5151: housing, 5152: connector, 5153: substrate, 5155: memory chip, 5156: controller chip, 5200: portable game machine, 5201: housing, 5202: display portion, 5203: button, 5300: desktop information terminal, 5301: main body, 5302: display, 5303: keyboard, 5400: ICD main unit, 5401: battery, 5402: wire, 5403: wire, 5404: antenna, 5405: subclavian vein, 5406: superior vena cava, 5500: information terminal, 5510: housing, 5511: display portion, 5700: automobile, 5800: electric refrigerator-freezer, 5801: housing, 5802: refrigerator door, 5803: freezer door, 5900: information terminal, 5901: housing, 5902: display portion, 5903: operation button, 5904: operator, 5905: band, 6100: expansion device, 6101: housing, 6102: cap, 6103: USB connector, 6104: substrate, 6106: controller chip, 6240: digital camera, 6241: housing, 6242: display portion, 6243: operation button, 6244: shutter button, 6246: lens, 6300: video camera, 6301: first housing, 6302: second housing, 6303: display portion, 6304: operation key, 6305: lens, 6306: joint, 7520: main body, 7522: controller

The invention claimed is:

1. A memory device comprising:
a first layer comprising a circuit, the circuit comprising a driver circuit; and
a second layer stacked over the first layer, the second layer comprising a first memory cell electrically connected to the driver circuit,
wherein the first memory cell comprises a first transistor, a second transistor, a magnetic tunnel junction element, a first conductor, a second conductor, and a third conductor,
wherein the magnetic tunnel junction element comprises a free layer and a fixed layer stacked over the free layer,
wherein the free layer is electrically connected to a first terminal of the first transistor through the first conductor,
wherein the free layer is electrically connected to a first terminal of the second transistor through the first conductor,
wherein the free layer is positioned over the first conductor,
wherein a second terminal of the first transistor is electrically connected to a second conductor,
wherein the first conductor and the second conductor are positioned over an insulator and in contact with a top surface of the insulator,
wherein the fixed layer is electrically connected to a third conductor,
wherein the third conductor comprises a region intersecting with the second conductor,
wherein the circuit comprises a transistor comprising silicon in a channel formation region, and
wherein each of the first transistor and the second transistor comprises a metal oxide in a channel formation region.

2. A memory device comprising:
a first layer comprising a circuit, the circuit comprising a driver circuit; and
a second layer stacked over the first layer, the second layer comprising a first memory cell electrically connected to the driver circuit,
wherein the first memory cell comprises a first transistor, a second transistor, a magnetic tunnel junction element, a first conductor, a second conductor, and a third conductor,
wherein the magnetic tunnel junction element comprises a free layer and a fixed layer stacked over the free layer,
wherein the free layer is electrically connected to a first terminal of the first transistor through the first conductor,
wherein the free layer is electrically connected to a first terminal of the second transistor through the first conductor,
wherein the free layer is positioned over the first terminal of the first transistor the first conductor,
wherein a second terminal of the first transistor is electrically connected to a second conductor,
wherein the first conductor and the second conductor are positioned over an insulator and in contact with a top surface of the insulator,
wherein the fixed layer is electrically connected to a third conductor,
wherein the third conductor comprises a region intersecting with the second conductor,
wherein the second conductor comprises a region configured to be a bit line,
wherein the third conductor comprises a region configured to be a read bit line,
wherein the circuit comprises a transistor comprising silicon in a channel formation region, and
wherein each of the first transistor and the second transistor comprises a metal oxide in a channel formation region.

3. The memory device according to claim 1, further comprising a third layer,
wherein the third layer comprises a second memory cell, and
wherein the third layer is stacked over the second layer.

4. The memory device according to claim 2, further comprising a third layer,
wherein the third layer comprises a second memory cell, and
wherein the third layer is stacked over the second layer.

* * * * *